United States Patent
Raghav et al.

(10) Patent No.: US 7,940,792 B2
(45) Date of Patent: May 10, 2011

(54) SYSTEM AND METHODS FOR FACILITATING THIRD-PARTY CALL AND DEVICE CONTROL

(75) Inventors: Amritansh Raghav, Seattle, WA (US); Eran Shtiegman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1216 days.

(21) Appl. No.: 10/776,489

(22) Filed: Feb. 11, 2004

(65) Prior Publication Data

US 2005/0174987 A1 Aug. 11, 2005

(51) Int. Cl.
*H04J 3/16* (2006.01)

(52) U.S. Cl. .................................. 370/466; 370/352

(58) Field of Classification Search .................. 370/352, 370/466; 709/204, 227; 340/825.52; 379/88.13; 455/456.1, 445

See application file for complete search history.

(56) References Cited

U.S. PATENT DOCUMENTS

| | | | | |
|---|---|---|---|---|
| 5,541,928 A * | 7/1996 | Kobayashi et al. | ...... | 340/825.52 |
| 6,167,433 A * | 12/2000 | Maples et al. | ................ | 709/204 |
| 6,373,930 B1 * | 4/2002 | McConnell et al. | ..... | 379/114.28 |
| 6,625,258 B1 * | 9/2003 | Ram et al. | ................. | 379/88.13 |
| 2002/0006137 A1 * | 1/2002 | Rabenko et al. | .............. | 370/466 |
| 2002/0073150 A1 * | 6/2002 | Wilcock | ......................... | 709/204 |
| 2002/0073208 A1 * | 6/2002 | Wilcock et al. | ............... | 709/227 |
| 2002/0118675 A1 * | 8/2002 | Strathmeyer et al. | ......... | 370/352 |
| 2003/0023730 A1 * | 1/2003 | Wengrovitz et al. | .......... | 709/227 |
| 2003/0076815 A1 * | 4/2003 | Miller et al. | .................. | 370/352 |
| 2004/0196965 A1 * | 10/2004 | Birger et al. | ............... | 379/88.13 |
| 2005/0113108 A1 * | 5/2005 | Kadakia et al. | ............ | 455/456.1 |

FOREIGN PATENT DOCUMENTS

| | | |
|---|---|---|
| JP | 2000-041272 A | 2/2000 |
| JP | 2002-118594 A | 4/2002 |

OTHER PUBLICATIONS

Roach, Session Initiation Protocol (SIP)—Specific Event Notification, Network Working Group, Request for Comments 3265, Updates 2543, Jun. 2002, [p. 11]-[p. 38].*

Roach, Session Initiation Protocol (SIP)—Specific Event Notification, Network Working Group, Request for Comments 3265, Update 2543, Jun. 2002, [p. 1]-[p. 38] (this document was previously presented to Applicant).*

Roach, Session Initiation Protocol (SIP)—Specific Event Notification, Network Working Group, Request for Comments 3265, Updates 2543, Jun. 2002, [p. 1]-[p. 38]. Previously provided.*

* cited by examiner

*Primary Examiner* — Kwang B Yao
*Assistant Examiner* — Andrew Lai
(74) *Attorney, Agent, or Firm* — Perkins Coie LLP

(57) ABSTRACT

The present invention comprises a system and methods for facilitating third-party call control using a peer-to-peer configuration with SIP. More specifically, the present invention comprises a system and methods, including protocols, for: modeling a communication device as a logical representation and a physical representation thereof; associating the logical representation and the physical representation with unique identifiers; identifying all of the communication devices on a network; determining the relationships between the identified communication devices; establishing a device control channel for each physical representation; establishing a call control channel for each logical representation; controlling the logical representation and the physical representation via the call and device control channels; monitoring the state of the logical representation and the physical representation via the call and device control channels; and, storing data representing the state of the logical representation and the physical representation.

18 Claims, 11 Drawing Sheets

SYSTEM AND METHODS FOR FACILITATING THIRD-PARTY CALL AND DEVICE CONTROL

TECHNICAL FIELD

The present invention relates, generally, to third-party call and device control systems and methods, and, more particularly, to third-party call and device control systems and methods utilizing the session initiation protocol (SIP).

BACKGROUND OF THE INVENTION

Third-party call control allows a non-endpoint entity to originate and manage a call between other entities. Early telephony networks relied on the premise that all calls begin at an endpoint that provided the signaling and interface necessary to make the call. Even within more modern telephony networks, basic network operations required that a call originate at an endpoint possessing capabilities for media and signaling. Consequently, third-party call control was not supported in prior public switched telephone networks (PSTNs). As PSTN standards advanced, third-party call control mechanisms were introduced, but few third-party call control solutions were widely implemented. Although the premise that all calls begin at an endpoint capable of providing signaling and appropriate interfaces was sufficient for plain old telephone services (POTS), the premise potentially restricted the evolution of enhanced services and data interfaces.

As softswitches were introduced, media and signaling could effectively be separated. A softswitch is an application program interface (API) used to connect a traditional PSTN to a voice over internet protocol (VOIP) product. The softswitch linked the PSTN to IP networks and managed multiple signaling types.

Today, multimedia networks are based on Internet protocols and, therefore, allow for the separation of media and signaling and the separation of applications from the signaling and media aspects of a communications session. Consequently, third-party application servers may effectively manage the attributes of a call between participants. The session initiation protocol (SIP) was created, among other reasons, to support the creation of real-time communication sessions in IP networks. Together with the session description protocol (SDP), the session initiation protocol (SIP) may effectively separate the transfer of media and signaling within a communication session.

Although SIP provides a mechanism for implementing third party call control, several approaches have been introduced to enable third-party call control, but each approach possesses significant disadvantages. The most common approach is to develop SIP third-party call control that closely resembles the current computer-telephony-integration (CTI) model. In this approach, a back-to-back user agent controls and bridges the multiple call legs to other user agents. Unfortunately, the end-to-end semantics of SIP are broken, because each user agent views itself in session with the back-to-back user agent instead of the other endpoint. The third-party controller must explicitly be aware of the back-to-back user agent for this approach to be effective.

In another SIP approach, third-party call control is modeled using a peer-to-peer configuration. This SIP approach eliminates the need for a back-to-back user agent, but increases the complexity of the type of SIP primitives an endpoint must process. Although such an approach may be desirable, no such successful implementation is known to have existed in the past.

Accordingly, there is a need in the industry for systems and methods for controlling and monitoring communication devices through third-party call control using a peer-to-peer configuration with SIP.

Therefore, there is a need in the industry for systems and methods of controlling and monitoring communication devices that provide third-party call control and that overcome the complexities involved with implementing a third-party call control using a peer-to-peer configuration with SIP.

SUMMARY OF THE INVENTION

Broadly described, the present invention comprises a system and methods for facilitating third-party call control using a peer-to-peer configuration with SIP. More specifically, the present invention comprises a system and methods, including protocols, for: modeling a communication device as a logical representation and a physical representation thereof; associating the logical representation and the physical representation with unique identifiers; identifying all of the communication devices on a network; determining the relationships between the identified communication devices; establishing a device control channel for each physical representation; establishing a call control channel for each logical representation; controlling the logical representation and the physical representation via the call and device control channels; monitoring the state of the logical representation and the physical representation via the call and device control channels; and, storing data representing the state of the logical representation and the physical representation.

Advantageously, the present invention provides a solution for third-party call control using a peer-to-peer configuration with SIP. By addressing the complexities involved with implementing end-to-end communication between communication devices using SIP messaging, the present invention substantially eliminates the need for a controller unit to be aware of a back-to-back user agent that facilitates communication between all communication device endpoints. Through the introduction and use of SIP messaging with extensible markup language (XML) and simple object access protocol (SOAP) code, the present invention effectively manages the complex situations involved with implementing peer-to-peer third-party call control. According to a method of the present invention, a communication device is modeled as separate logical and physical representations. The logical representation allows for line/call services and the physical representation allows for access to the physical attributes of a communication device. Separate communication channels are opened between the controller unit and the logical representation (i.e., a call control channel) and the controller unit and the physical representation (i.e., a device control channel) of the communication device. Separate communication channels are also opened between a monitoring unit and the logical representation (i.e., a call control channel) and the monitoring unit and the physical representation (i.e., a device control channel) of the communication device. By controlling and monitoring separate communication channels, the present invention may effectively control and monitor the logical and physical representations of the communication device.

Other features and advantages of the present invention will become apparent upon reading and understanding the present specification when taken in conjunction with the appended drawings.

DETAILED DESCRIPTION OF THE INVENTION

Figure 1:
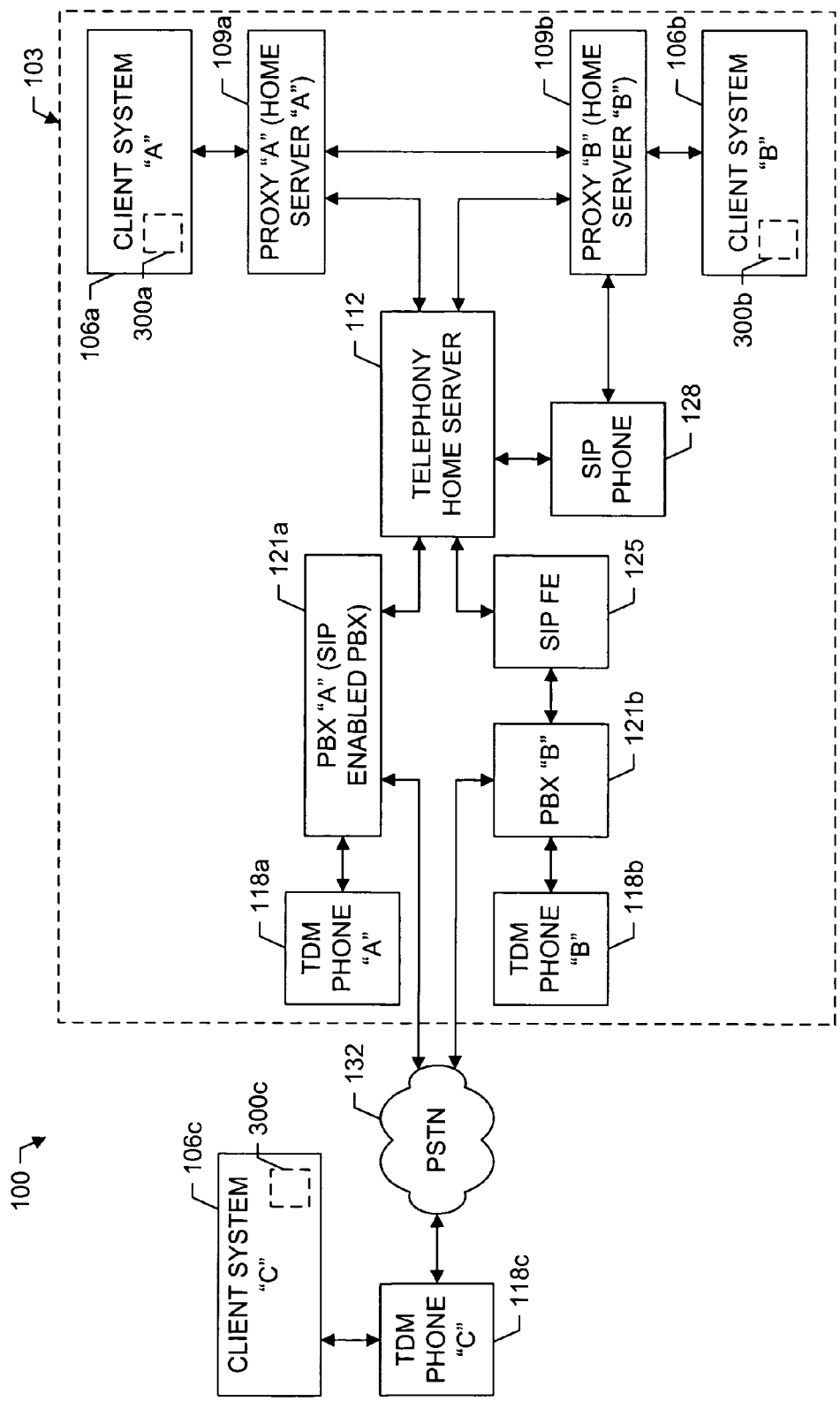
FIG. 1 displays a block diagram representation of a third-party call control system in accordance with an exemplary embodiment of the present invention and an environment therefore.

Referring now to the drawings, in which like numerals represent like components or steps throughout the several views, FIG. 1 displays a block diagram representation of an environment 100 for third party call control system 300 in accordance with an exemplary embodiment of the present invention. The environment 100 comprises a plurality of client systems 106 that include hardware and software components similar to those found in well-known computing systems, environments, and/or configurations described more fully below with reference to FIG. 2. Each client system 106 comprises a third-party call control system 300 residing thereon. Typically, multiple client systems 106a, 106b reside within a network sub-hierarchy 103 of a domain name system (DNS) name space. One skilled in the art will recognize that a network sub-hierarchy 103 typically comprises the infrastructure and facilities appropriate to communicatively connect a group of two or more client systems 106 (including, without limitation, a plurality of computer systems in communication with each other). Such a sub-hierarchy network 103 and client systems 106 may be configured in multiple topologies including, but not limited to, star, bus, or ring configurations. Also, a network sub-hierarchy 103 and client systems 106 may be broadly categorized as belonging to a particular architecture including, but not limited to, peer-to-peer or client/server architectures. The network sub-hierarchy 103 may additionally be classified by the geographical location of the client systems 106 and the types thereof. For example, a network sub-hierarchy 103 communicatively connecting a plurality of computer systems or servers located proximate to each other, such as within a building, is often referred to as a local-area network (LAN); if the computer systems are located farther apart, the network sub-hierarchy 103 is generally referred to as a wide-area network (WAN), such as the Internet; if the computer systems are located within a limited geographical area, such as a university campus or military establishment, the network sub-hierarchy 103 is typically referred to as a campus-area network (CAN); if the computer systems are connected together within a city or town, the network sub-hierarchy 103 is generally referred to as a metropolitan-area network (MAN); and, if the computer systems are connected together within a user's home, the network sub-hierarchy 103 is often referred to as a home-area network (HAN).

Each client system 106 communicatively connects to a proxy server 109 (i.e., also sometimes referred to in the industry as a "home server 109"). One skilled in the art will recognize that a proxy server 109 is generally located between a client system 106 and another server. When client system 106 (i.e., through operation of a computer application, program, or program module) makes a request to a destination server, the proxy server 109 attempts to satisfy the request itself. If the proxy server 109 cannot satisfy the request from the client system 106, then the proxy server 109 forwards the request to the destination server. The main purpose of a proxy server 109 is to improve performance within a group of users or client systems 106 by minimizing the number of requests sent to a destination server. The proxy server 109 may be configured similarly to computer system 210 described below with reference to FIG. 2.

The proxy server 109 communicatively connects to a telephony home server 112. Proxy server 109b also communicatively connects to a session initiation protocol (SIP) phone 128 (i.e., also generically referred to herein as a "communication device 128"). The telephony home server 112 enables communication between the client systems 106a, 106b and any associated telephony devices. The telephony home server 112 may be configured similarly to the computer system 210 described below with reference to FIG. 2 and, generally, comprise applications, programs, or program modules operable for communicating with telephony devices.

Typically, the telephony home server 112 communicatively connects, indirectly or directly, with a time division multiplexing (TDM) telephone 118 (i.e., also generically referred to herein as a "communication device 118") through a PBX 121. One skilled in the art will recognize that a PBX 121 is a private telephone network generally used within an organization in order to share a limited number of outside lines with its internal TDM telephones 118. A PBX 121 acts as a call center by accepting incoming calls and routing the calls to the appropriate device, such as a TDM telephone 118. Traditionally, a PBX 121 is configured as a computer-telephony-integration (CTI) system (i.e., PBX 121b), but may also be configured as a SIP-enabled PBX 121a. In an exemplary embodiment of the present invention, the telephony home server 112 communicatively connects to a SIP front-end (FE) unit 125 that is adapted to convert, or translate, CTI data and/or messages into SIP data and/or messages and convert, or translate, SIP data and/or messages into CTI data and/or messages. The SIP FE unit 125 connects to a non-SIP enabled PBX 121b for communication. Each PBX 121a, 121b residing in the network sub-hierarchy 103 may communicatively connect, via a public switched telephone network (PSTN) 132, to other devices outside the network sub-hierarchy 103 such as, but not limited to, a TDM telephone 118c, a PBX (not shown), or a client system 106c.

The third-party call control system 300 of each client system 106 is equipped with a user interface 315 and appropriate software (described in more detail with reference to FIG. 3) to facilitate communication with an associated communication device 118, 128. Preferably, every client system 106 and every communication device 118, 128 has a unique identifier so that messages and data can be directed to appropriate locations. For exemplary purposes only, client system "A" 106a and client system "B" 106b reside in the "phones.example.com" sub-hierarchy of the DNS name space. Accordingly, client system "A" 106*a* is identified by the uniform resource identifier (URI) of "userA@example.com" and client system "B" 106*b* is identified by the URI of "userB@example.com". TDM phone "A" 118*a* is associated with client system "A" 106*a* and is identified by an extension number of "1111" and a URI of "1111@PBXA.phones.example.com". Similarly, TDM phone "B" 118*b* is associated with client system "B" 106*b* and is identified by an extension number of "2222" and a URI of "2222@PBXB.phones.example.com". SIP phone 128 is also associated with client system "B" 106*b* and is identified by a URI of "userB-phone@phones.example.com". TDM phone "C" 118*c* is associated with client system "C" 106*c* and is identified by the number "555-1212", because it is not within the network sub-hierarchy 103 of "phones.examples.com".

The telephony home server 112 comprises, preferably, a real-time collaboration (RTC) server that serves as the front-end to all of or a group of PBXs 121 and, thus, allows the PBX topology to be abstracted away from the rest of the network. The SIP domain, on one side of the telephony home server 112, can utilize different security mechanisms than the telephony domain on the other side of the telephony home server 112. In one such SIP security mechanism, a third-party call control user is authenticated in the same way an instant message user is authenticated (i.e., by use of a username and password). Additionally, authorization rules of a phone or line can be tied to the "owner" of the phone or line and can reside in the same place as other authorization data for the "owner". This is accomplished, for example, by tying a line and a phone to a user and requiring that the user's proxy server 109 be responsible for authorizing access to the phone or line.

Preferably, client system "A" 106*a* includes functionality for monitoring and controlling TDM phone "A" 118*a* and client system "B" 106*b* includes functionality for monitoring and controlling TDM phone "B" 118*b* and SIP phone 128. To make a call to the user of client system "C" 106*c*, the user of client system "A" 106*a* utilizes third-party call control software via user interface 315 (see FIG. 3) to dial out, for example, to "555-1212". The client system "A" 106*a* provides a SIP message to proxy server "A" 109*a* which, in turn, provides the SIP message to the telephony home server 112. The SIP message contains the unique identifier associated with TDM phone "A" 118*a* (i.e., "1111@PBXA.phones.example.com") as well as the unique identifier associated with client system "A" 106*a* (i.e., "userA@example.com"). The unique identifier information ensures that the SIP message is sent to the correct location within the network. Based on the identifying information within the SIP message, the telephony home server 112 provides the SIP message to the SIP enabled PBX "A" 121*a*. The SIP enabled PBX "A" 121*a* interprets the SIP message, sends the TDM phone "A" 118*a* a control command to call the number "555-1212", and sends a new SIP message back to the client system "A" 106*a* via the telephony home server 112. TDM phone "A" 118*a* receives the control command and dials the number "555-1212". Client system "A" 106*a* is also monitoring TDM phone "A" 118*a*, through status inquiry SIP messages. As TDM phone "A" 118*a* opens a line and dials the number "555-1212", client system "A" 106*a* receives SIP messages with status data identifying the action taken by TDM phone "A" 118*a*. Client system "A" 106*a* stores this status data which may be used by the user interface 315 to update the user with the status of TDM phone "A" 118*a* (i.e., that TDM phone "A" has an open line and is dialing "555-1212").

The user of client system "B" 106*b* may make a call to TDM phone "C" 118*c* with TDM phone "B" 118*b* or with SIP phone 128. If the user of client system "B" 106*b* wants to make a call to TDM phone "C" 118*c* with TDM phone "B" 118*b*, then the process is substantially the same as described above for client system "A" 106*a* with the following exception. Because PBX "B" 121*b* is not a SIP-enabled PBX 121*a*, PBX "B" 121*b* is only operable with CTI data. Therefore, the telephony home server 112 provides the SIP message from client system "B" 106*b* to a SIP FE unit 125. The SIP FE unit 125 interprets the SIP message, converts the SIP message into CTI data instructing TDM phone "B" to call "555-1212", and provides the CTI data to PBX "B" 121*b*. The PBX "B" 121*b* sends a control command to TDM phone "B" 118*b* instructing it to dial out to "555-1212" and provides a CTI response to SIP FE unit 125. The SIP FE unit 125 interprets the CTI response, converts the response into a SIP response, and provides the SIP response to client system "B" 106*b* via the telephony home server 112. If, however, the user of client system "B" 106*b* desires to make a call to TDM phone "C" 118*c* with SIP phone 128, then the client system "B" 106*b* provides a SIP message to proxy server "B" 109*b* which, in turn, provides the SIP message to the SIP phone 128. In an alternative embodiment, the proxy server "B" 109*b* provides the SIP message to the telephony home server 112 which, then, provides the SIP message to the SIP phone 128. No intermediate conversion is necessary, because the SIP phone 128 is operable to receive and act upon SIP messages. In such an alternative embodiment, the SIP phone 128 opens a line, calls the number "555-1212", and provides a new SIP message to client system "B" 106*b* through the telephony home server 112 or proxy server "B" 109*b*.

A call from client system "C" 106*c* via TDM phone "C" 118*c* to TDM phone "B" 118*b*, for example, causes TDM phone "B" 118*b* to ring and client system "B" 106*b*, through its monitoring activities, detects such ringing. In other words, client system "B" 106*b* receives SIP messages with status data identifying that TDM phone "B" 118*b* is ringing. The status data is stored by client system "B" 106*b* and is used to notify the user, via the user interface 315, that TDM phone "B" 118*b* is ringing.

One skilled in the art will recognize that connecting communicatively may include or require any appropriate type of connection for the bidirectional communication of signals and/or media including, but not limited to, analog, digital, wired and wireless communication channels. Such communication channels may utilize, but not be limited to, copper wire, optical fiber, radio frequency, infrared, satellite, or other facilities and media. Additionally, one skilled in the art will recognize that third-party call control systems 300 may be utilized in connection with other environments 100 and, therefore, the present invention may be effectively implemented in different environments 100 and should not be limited to the exemplary environment 100 described above. Accordingly, an appropriate environment 100 may comprise multiple client systems 106, proxy servers 109, telephony home servers 112, communication devices 118, 128, and PBXs 121 and, therefore, is not limited to the number of client systems 106, proxy servers 109, telephony home servers 112, communication devices 118, 128, and PBXs 121 shown in FIG. 1. Furthermore, the present invention is not limited to only telephony communication devices 118, 128, such as a TDM telephone 118 or a SIP telephone 128. Communication devices 118, 128 include any type of device or computer software program that may communicate with another device or computer software program such as, but not limited to, mobile telephones, laptops, desktops, personal digital assistants (PDAs), instant messaging applications, email applications, and the like.

Figure 2:
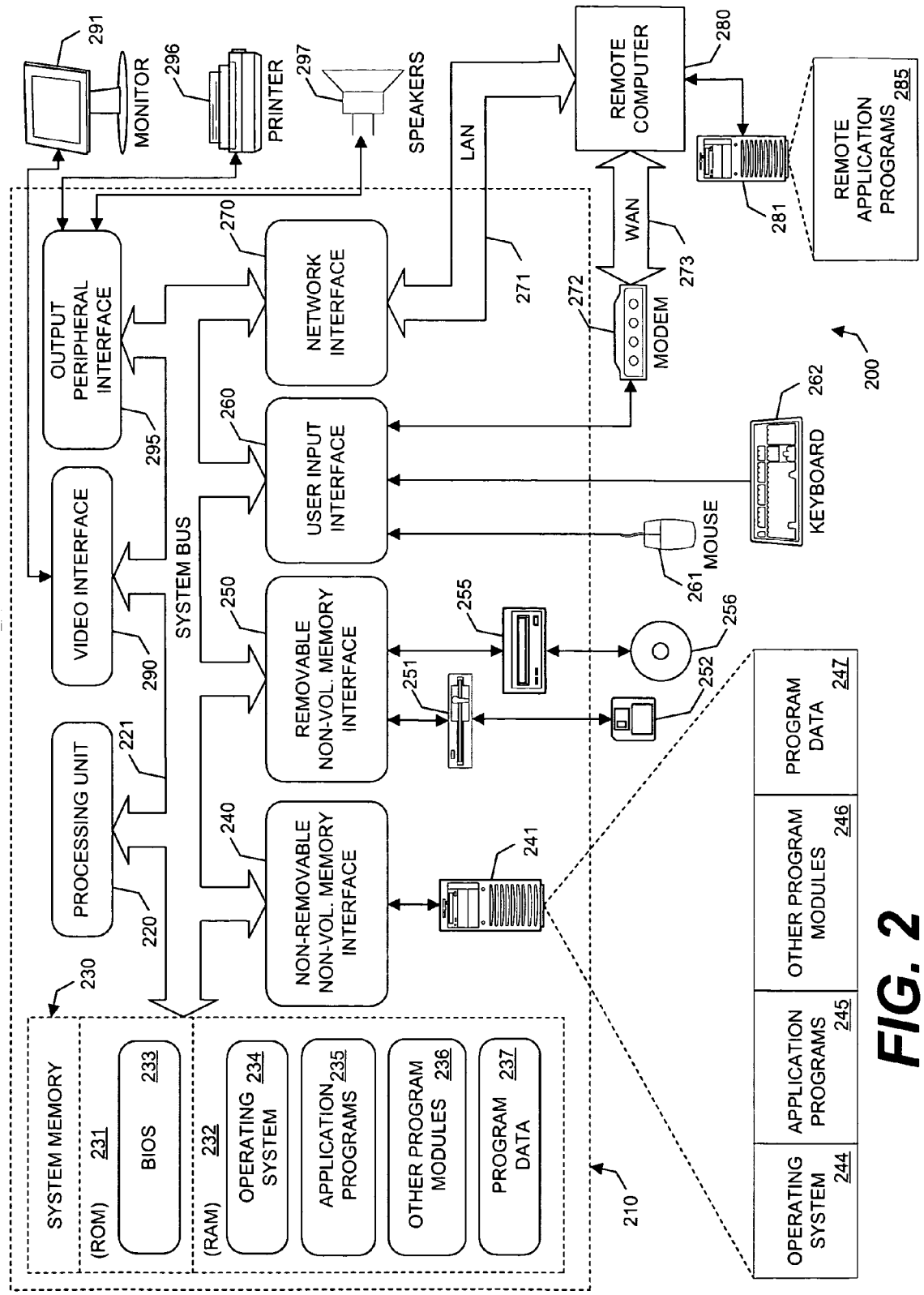
FIG. 2 displays a block diagram representation of a computing environment and computer systems thereof which the third-party call control system of FIG. 1 may utilize in accordance with the exemplary embodiment of the present invention.

FIG. 2 displays a block diagram representation of a computing environment 200 and computer systems 210, 280 thereof which the third-party call control system of FIG. 1 may utilize in accordance with the exemplary embodiment of the present invention. The computing environment 200 and computer systems 210, 280 thereof represent only one example of a suitable computing environment and computer systems for the practice of the present invention and are not intended to suggest any limitation as to the scope of use or functionality of the invention. Nor should the computer systems 210, 280 be interpreted as having any dependency or requirement relating to any one or combination of components illustrated in the exemplary computing environment 200.

Hence, it should be understood that the present invention is operational with numerous other general purpose or special purpose computing system environments or configurations. Examples of well-known computing systems, environments, and/or configurations that may be appropriate or suitable for use as client systems 106 of the present invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The present invention may also be described in the general context of comprising computer-executable instructions, such as program modules, being executed by a computer system. Generally, program modules include routines, programs, programming, objects, components, data, data structures, and the like that perform particular tasks or implement particular abstract data types. The present invention may be practiced in distributed computing environments where tasks are performed by remote processing devices that are linked through a communications network. In a distributed computing environment, program modules may be located in both local and remote computer storage media, including, without limitation, in memory storage devices.

Exemplary client systems 106, telephony home servers 112, and proxy servers 109 may comprise general purpose computing devices in the form of computer system 210, as illustrated in FIG. 2. Components of computer system 210 may include, but are not limited to, a processing unit 220, a system memory 230, and a system bus 221 that couples various system components including the system memory 230 to the processing unit 220 for bidirectional data and/or instruction communication. The system bus 221 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (i.e., also known as the "Mezzanine bus").

Computer system 210 typically includes a variety of computer-readable media. Computer-readable media may comprise any available media that can be accessed by, read from, or written to by computer system 210 and may include both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data, data structures, program modules, programs, programming, or routines. Computer storage media includes, but is not limited to, RAM, ROM, EEPROM, flash memory or other memory technology, CD-ROM, digital versatile disks (DVD) or other optical disk storage, magnetic cassettes, magnetic tape, magneto-optical storage devices, magnetic disk storage or other magnetic storage devices, or any other medium which can be used to store the desired information and which can be accessed by computer system 210. Communication media typically embodies computer-readable instructions, data, data structures, program modules, programs, programming, or routines in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer-readable media.

The system memory 230 includes computer storage media in the form of volatile and/or nonvolatile memory such as read only memory (ROM) 231 and random access memory (RAM) 232. A basic input/output system 233 (BIOS), containing the basic routines that direct the transfer of information between elements within computer 210, such as during start-up, is typically stored in ROM 231. RAM 232 typically stores data and/or program instructions that are immediately accessible to and/or presently being operated on by processing unit 220. By way of example, and not limitation, FIG. 2 illustrates operating system 234, application programs 235, other program modules 236, and program data 237 which may be resident in RAM 232, in whole or in part, from time-to-time.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that may be included in the exemplary computing environment 200 include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives 241, 251, 255 and their associated computer storage media discussed above and illustrated in FIG. 2, provide storage of computer-readable instructions, data, data structures, program modules, programs, programming, or routines for computer system 210. In FIG. 2, for example, hard disk drive 241 is illustrated as storing operating system 244, application programs 245, other program modules 246, and program data 247. Note that these components may either be the same as or different from operating system 234, application programs 235, other program modules 236, and program data 237. Operating system 244, application programs 245, other program modules 246, and program data 247 are given different numbers to illustrate that, at a minimum, they are different copies of operating system 234, application programs 235, other program modules 236, and program data 237. A user may enter commands and information into computer system 210 through connected input devices such as a keyboard 262 and pointing device 261, commonly referred to as a mouse, trackball or touch pad. Other connected input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor 291, computer system 210 may also include other peripheral output devices such as speakers 297 and printer 296, which may be connected through an output peripheral interface 295.

The computer system 210 may operate in a networked environment using bidirectional communication connection links to one or more remote computer systems, such as a remote computer system 280. The remote computer system 280 may be a personal computer, a laptop computer, a server computer, a router, a network PC, a peer device or other common network node, and typically includes many or all of the elements described above relative to the computer system 210, although only a memory storage device 281 of remote computer system 280 has been illustrated in FIG. 2. The bidirectional communication connection links depicted in FIG. 2 include a local area network (LAN) 271 and a wide area network (WAN) 273, but may also include other networks. Such networks are commonplace in offices, enterprise-wide computer networks, intranets and the Internet.

When communicatively connected to a LAN 271, the computer system 210 connects to the LAN 271 through a network interface or adapter 270. When communicatively connected to a WAN 273, the computer system 210 typically includes a modem 272 or other means for establishing a communication link over the WAN 273, such as the Internet. The modem 272, which may be internal or external, may be connected to the system bus 221 via the user input interface 260, or other appropriate mechanism. In a networked environment, program modules depicted relative to the computer system 210, or portions thereof, may be stored in the remote memory storage device 281. By way of example, and not limitation, FIG. 2 illustrates remote application programs 285 as residing in memory storage device 281. It will be appreciated that the network connections shown are exemplary and other means of establishing a bidirectional communication link between the computers may be used.

Figure 3:
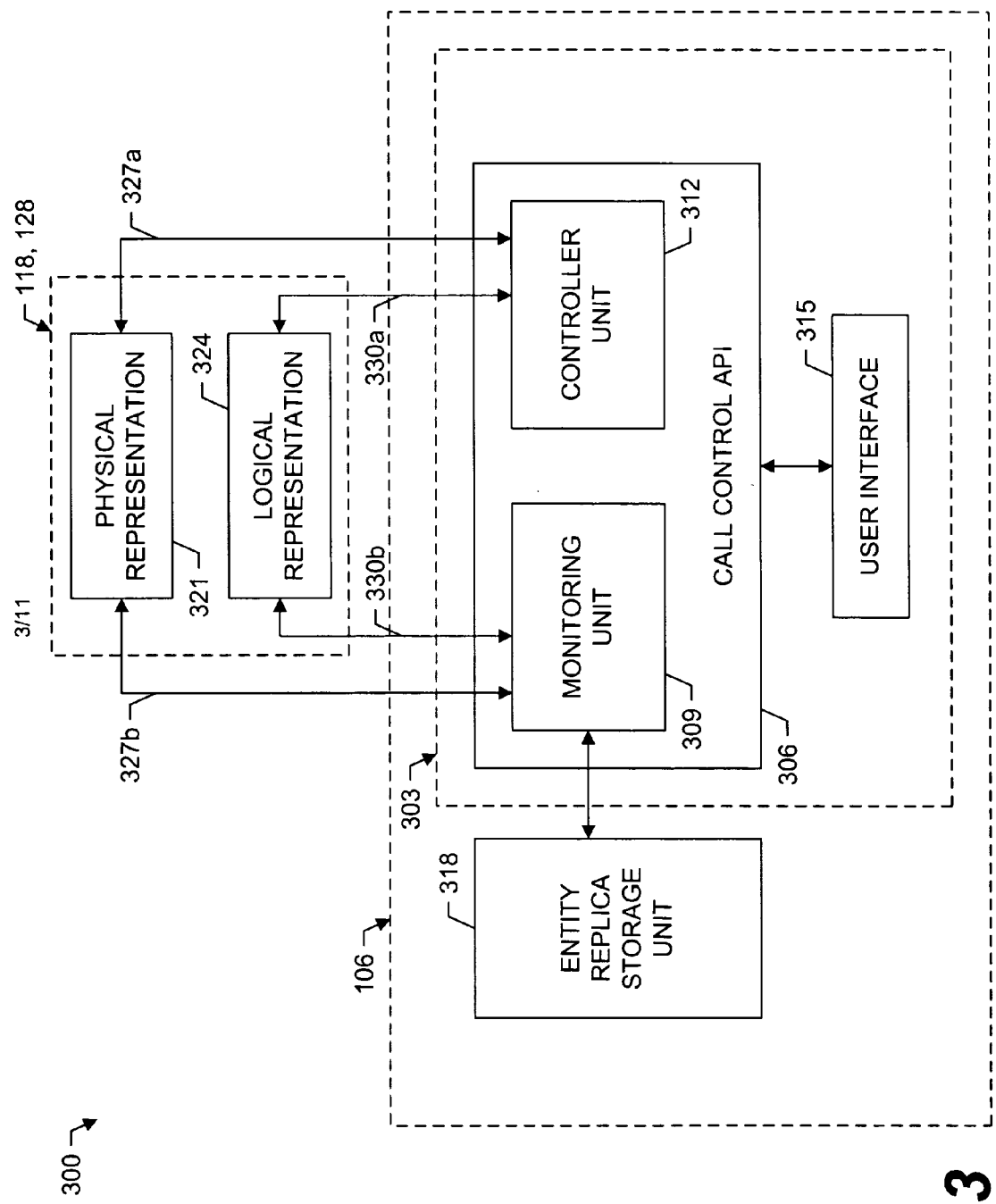
FIG. 3 displays a block diagram representation of a third-party call control system for controlling and monitoring a communication device in accordance with the exemplary embodiment of the present invention.

FIG. 3 displays a block diagram representation of a third-party call control system 300 of the present invention for controlling and monitoring a communication device 118, 128 in accordance with the exemplary embodiment thereof. In addition to the hardware and software components described above with reference to FIG. 2, each of the client systems 106 further comprises a third-party call control application 303 and an entity replica storage unit 318.

The entity replica storage unit 318 is a memory device capable of storing and retrieving data including, but not limited to, random access memory (RAM), flash memory, magnetic memory devices, optical memory devices, hard disk drives, removable volatile or non-volatile memory devices, optical storage mediums, magnetic storage mediums, or RAM memory cards. Alternatively, the entity replica storage unit 318 may comprise a remote storage facility accessible through a wired and/or wireless network system. Additionally, the entity replica storage unit 318 may comprise a memory system comprising a multi-stage system of primary and secondary memory devices, as described above. The primary memory device and secondary memory device may operate as a cache for the other or the second memory device may serve as a backup to the primary memory device. In yet another arrangement, the entity replica storage unit 318 may comprise a memory device configured as a simple database file or as a searchable, relational database using a query language, such as SQL.

The third-party call control program application 303 provides the client system 106 with the functionality to control and monitor a communication device 118, 128. The third-party call control program application 303 comprises a user interface 315 and a call control API 306 including a monitoring unit 309 and a controller unit 312. The user interface 315 communicatively connects to the call control API 306 and, consequently, communicatively connects to the monitoring unit 309 and the controller unit 312.

The monitoring unit 309 and the controller unit 312 comprise computer software program modules within the call control API 306. The controller unit 312 communicatively connects to a physical representation 321 of a communication device 118, 128 and a logical representation 324 of a communication device 118, 128. The monitoring unit 309 communicatively connects to a physical representation 321 of a communication device 118, 128, a logical representation 324 of a communication device 118, 128, and the entity replica storage unit 318.

In operation, a user of the client system 106 controls and monitors a communication device 118, 128 via the third-party call control program 303. In an exemplary embodiment of the present invention, the communication device 118, 128 is modeled as two representations. More specifically, the communication device 118, 128 may be modeled as a physical representation 321 and a logical representation 324. For telephony devices, the physical representation 321 comprises the physical attributes of the telephony device and, accordingly, offers user interaction with and control of those physical attributes. The logical representation 324 offers call and/or line services of the communication device 118, 128 to a user. Together, the physical representation 321 and the logical representation 324 offer telephony functionality such as, but not limited to, dialing out, hanging up, answering a call, transferring a call, putting a caller on hold, forwarding a call, parking a call, retrieving a call or message, adding callers to a conference, removing a communication device from a conference, removing another caller from a conference, turning a speaker phone on or off, generating dual-tone multi-frequency DTMF, and gathering digits.

The user interface 315 provides a user of a client system 106a with a display of data representing the status of the communication devices 118, 128 that are currently being monitored. Additionally, the user interface 315 facilitates the control of communication devices 118, 128 by a user of the client system 106. One skilled in the art will recognize that a user interface 315 may be implemented in multiple configurations and is typically displayed to a user via a computer monitor 291. The user interface 315 generally receives input from a user by means of an input device such as, but not limited to, a keyboard 262 and/or mouse 261.

After receiving input from a user, the user interface 315 makes a control request to the call control API 306. Control requests are directed to the controller unit 312 of the call control API 306. Depending on whether the user request relates to a device attribute (i.e., relating to the physical representation 321) or a call attribute (i.e., relating to the logical representation 324), the controller unit 312 sends the appropriate SIP message to the communication device 118, 128. If the user request relates to a call attribute, then the controller unit 312 sends the appropriate SIP message to the communication device 118, 128 and the logical representation 324 thereof. If the user request relates to a device attribute, then the controller unit 312 sends the appropriate SIP message to the communication device 118, 128 and the physical representation 321 thereof. Accordingly, the communication device 118, 128 fulfills the user request as described in the received SIP message. The communication device 118, 128 may provide a SIP response to the original SIP message. As described above with reference to FIG. 1, if the communication device 118, 128 is a SIP phone 128, then the SIP phone 128 can generate the appropriate SIP response to the original SIP message. If the communication device 118, 128 is a TDM phone 118 associated with a SIP enabled PBX 121a, then the SIP enabled PBX 121a generates the SIP response to the original SIP message. If the communication device 118, 128 is a TDM phone 118 associated with a typical PBX 121b, then a SIP FE 125 converts the CTI response from the PBX 121b to a SIP response to the original SIP message. The SIP response from the communication device 118, 128 is provided to the controller unit 312 and may then be provided to the user interface 315.

The monitoring unit 309 continually generates SIP notify messages and provides them to the physical representation 321 and logical representation 324 of the communication device 118, 124. The monitoring unit 309 uses the responses to the SIP notify messages to generate data representing the current state of the communication device 118, 128. The generated data is provided by the monitoring unit 309 to the entity replica storage unit 318 for storage therein. In an exemplary embodiment of the present invention, the data stored in the entity replica storage unit 318 represents the exact and current state of the communication device 118, 128 being monitored. The data stored in the entity replica storage unit 315 is provided to the user interface 315, via the monitoring unit 309, to display the current state of the communication device 118, 128 to the user. The monitoring and controlling of a communication device 118, 128 are independent functions and, therefore, the monitoring unit 309 does not communicate directly with the controller unit 312 to acquire data representing the current state of the communication device 118, 128.

In an exemplary embodiment of the present invention, the call control (i.e., controlling or monitoring the logical representation 324 of the communication device 118, 128) and the device control (i.e., controlling or monitoring the physical representation 321 of the communication device 118, 128) are realized through traditional SIP messaging and SIP messaging extensions of the present invention which are coupled through use of extensible markup language (XML) code. The Session Initiation Protocol (SIP), an application-layer control/signaling protocol, is a standard protocol that is well-known to one skilled in the art. Briefly described, SIP supports communication between communication devices 118, 128 and client system 106. SIP provides the standard for initiation, modification, and termination of a communication session. Each communication session is represented by SIP relationships between communication devices 118, 128 and client systems 106 and is managed by SIP dialog between such communication devices 118, 128 and client systems 106. SIP works in conjunction with other common protocols such as, but not limited to, Real-time Transport Protocol (RTP), Real-Time Streaming Protocol (RTSP), Media Gateway Control Protocol (MEGACO), and Session Description Protocol (SDP). Together with other common protocols, SIP enables client systems 106 to identify and connect to communication devices 118, 128, thus creating a communications session. SIP provides the necessary primitives used to implement a variety of services, however, SIP does not provide program modules, such as the program modules associated with the call control API 306 described herein, nor the methods or protocols described herein.

For example and not limitation, Tables 1-8 provide call flows of exemplary SIP messages relating to the functionality of the present invention described herein. Initialization of third-party call control begins with opening two different control channels to the communication device 118, 128. One of the control channels is to the physical representation 321 of the communication device 118, 128 and is called the device control channel 327. The other control channel is to the logical representation 324 of the communication device 118, 128 and is called the call control channel 330. In SIP terms, the channels 327, 330 comprise dialogs between the client system 106 and the communication device 118, 128.

Tables 1 and 2 provide the SIP call flows for initializing the device control channel 327 to the physical representation 321 of the communication device 118, 128. More specifically, Table 1 illustrates querying capabilities provided by SIP and the creation of the device control channel 327 and Table 2 illustrates the client system 106 subscribing to the device state associated with the device control channel 327.

TABLE 1

OPTIONS sip: userB-phone@phones.example.com SIP/2.0
Via: SIP/2.0/TCP userB-pc.example.com;branch=z9hG4bKADx
Max-Forwards: 70
From: User B <userB@example.com>; tag=adx
To: 1111@phones.example.com
Call-ID: dx@userB-pc.example.com
CSeq: 1 OPTIONS
Contact: <sip:userB@userB-pc.example.com>
Accept: application/sdp
Content-Type: ??
SIP/2.0 200 OK
Via: SIP/2.0/TCP userB-pc.example.com;branch=z9hG4bKADx
To: sip:1111@phones.example.com;tag=pdx
From: User B <sip:userB@example.com>;tag=adx
Call-ID: dx@userB-pc.example.com
CSeq: 1 OPTIONS
Contact: <sip:1111@phones.example.com>
Allow: INVITE, ACK, CANCEL, OPTIONS, BYE, SERVICE
Allow-Events: dialog, phone-device
Accept: application/sdp
Accept-Encoding: gzip
Accept-Language: en
Supported: Replaces, Referred-By
Content-Type: application/sdp
Content-Length: ??
INVITE sip:1111@phones.example.com SIP/2.0
Via: SIP/2.0/TCP userB-pc.example.com;branch=z9hG4bKAD1
Max-Forwards: 70
To: 1111@phones.example.com
From: User B <userB@example.com>;tag=ad1
Call-ID: ad1@userB-pc.example.com
CSeq: 1 INVITE
Contact: <sip:userB@userB-pc.example.com>
Accept: application/sdp
Content-Type: ??
SIP/2.0 200 OK
Via: SIP/2.0/TCP userB-pc.example.com;branch=z9hG4bKAD1
From: User B <userB@example.com>;tag=ad1
To: <sip:1111@phones.example.com>;tag=pd1
Call-ID: ad1@userB-pc.example.com
CSeq: 1 INVITE
Contact: pbxB.phones.example.com
ACK sip:1111@phones.example.com SIP/2.0
Via: SIP/2.0/TCP userB-pc.example.com;branch=z9hG4bKAD1

TABLE 1-continued

Max-Forwards: 70
To: 1111@phones.example.com
From: User B <userB@example.com>;tag=ad1
Call-ID: ad1@userB-pc.example.com;tag=pd1
CSeq: 1 ACK
Contact: <sip:userB@userB-pc.example.com>

TABLE 2

SUBSCRIBE sip:1111@phones.example.com SIP/2.0
Via: SIP/2.0/TCP userB-pc.example.com;branch=z9hG4bKAD1
From: User B <userB@example.com>;tag=ad1
To: sip:1111@phones.example.com;tag=pd1
Call-ID: ad1@userB-pc.example.com
CSeq: 1 SUBSCRIBE
Contact: <sip:userB@userB-pc.example.com>
Event: phone-device
Expires: ??
Accept: application/phone-info+xml
SIP/2.0 200 OK
Via: SIP/2.0/TCP userB-pc.example.com;branch=z9hG4bKAD1
From: User B <userB@example.com>;tag=ad1
To: <sip:1111@phones.example.com>;tag=pd1
Call-ID: ad1@userB-pc.example.com
CSeq: 1 SUBSCRIBE
Expires: ??
Contact: ??
NOTIFY sip:userB@userB-pc.example.com SIP/2.0
Via: SIP/2.0/TCP phones.example.com;branch=z9hG4bKPD1
From: <sip:1111@phones.example.com>;tag=pd1
To: User B <sip:userB@ example.com>;tag=ad1
Call-ID: ad1@userB-pc.example.com
CSeq: 1 NOTIFY
Event: phone-device
Subscription-State: ??;expires=??
Contact: ??
Contact-Type: application/phone-info+xml
Device State XML Doc not shown
SIP/2.0 200 OK
From: User B <userB@example.com>;tag=ad1
To: <sip:1111@phones.example.com>;tag=pd1
Call-ID: ad1@userB-pc.example.com
CSeq: 100 NOTIFY
Contact: ??

Tables 3 and 4 provide the SIP call flows for establishing the call control channel 330 with the logical representation 324 of the communication device 118, 128. More specifically, Table 3 illustrates querying capabilities provided by SIP and Table 4 illustrates the client system 106 subscribing to the call/dialog state associated with the call control channel 330. Creating the call control channel 330 is similar to the SIP call flow illustrated in Table 1. If the phone and line URIs are the same (i.e., the remote endpoints of the communication device 118, 128 and the device control 327 channel are the same), then it is unnecessary to send a SIP OPTIONS message a second time, because the information has already been collected during initialization of the device control channel 327.

TABLE 3

OPTIONS sip: 1111@phones.example.com SIP/2.0
Via: SIP/2.0/TCP userB-pc.example.com;branch=z9hG4bKADx
Max-Forwards: 70
From: User B <sip:userB@example.com>; tag=adx
To: sip:1111@phones.example.com
Call-ID: dx@userB-pc.example.com
CSeq: 1 OPTIONS
Contact: <sip:userB@userB-pc.example.com>
Accept: application/sdp
Content-Type: ??
SIP/2.0 200 OK
Via: SIP/2.0/TCP userB-pc.example.com;branch=z9hG4bKADx TABLE 3-continued To: sip:1111@phones.example.com;tag=pdx
From: User B <sip:userB@example.com>;tag=adx
Call-ID: dx@userB-pc.example.com
CSeq: 1 OPTIONS
Contact: <sip:1111@phones.example.com>
Allow: INVITE, ACK, CANCEL, OPTIONS, BYE, REFER
Allow-Events: dialog
Accept: application/sdp
Accept-Encoding: gzip
Accept-Language: en
Supported: Replaces, Referred-By
Content-Type: application/sdp
Content-Length: ??

TABLE 4

SUBSCRIBE sip:1111@phones.example.com SIP/2.0
From: User B <userB@example.com>;tag=ad2
To: <sip:1111@phones.example.com>
Call-ID: ad2@userB-pc.example.com
CSeq: 1 SUBSCRIBE
Contact: <sip:userB@userB-pc.example.com>
Event: dialog
Expires: ??
Accept: application/dialog-info+xml
Content-Type: ??
SIP/2.0 200 OK
From: User B <userB@example.com>;tag=ad2
To: <sip:1111@phones.example.com>;tag=pd2
Call-ID: ad2@userB-pc.example.com
CSeq: 1 SUBSCRIBE
Contact: ??
NOTIFY sip:userB@userB-pc.example.com SIP/2.0
From: User B<userB@phones.example.com>;tag=ad2
To: <sip:1111@phones. example.com>;tag=pd2
Call-ID: ad2@userB-pc.example.com
CSeq: 100 NOTIFY
Event: dialog
Subscription-State: ??;expires=??
Contact: ??
Contact-Type: application/dialog-info+xml
<?xml version= "1.0"?>
  <dialog-info xmlns= "urn:ietf:params:xml:ns:dialog-info"
            version= "4"
            state= "full"
            entity= "sip:1111@phones.example.com">
    <dialog />
  </dialog-info>
SIP/2.0 200 OK
From: User B <userB@example.com>;tag=ad2
To: <sip:1111@phones.example.com>;tag=pd2
Call-ID: ad2@userB-pc.example.com
CSeq: 100 NOTIFY
Contact: ??

Table 5 illustrates the SIP call flow of a client system 106 initiating a call. More specifically, Table 5 illustrates a client system "B" 106b initiating a call using a speaker phone to client system "C" 106c, where the 200 OK responses to the SIP NOTIFYs are not shown. In an exemplary embodiment of the present invention, a simple object access protocol (SOAP) request and XML code is used in conjunction with SIP SERVICE and SIP NOTIFY messages to enable call initialization. In SIP, a REFER creates an implicit subscription to the state of the transaction caused by the REFER. Because there already exists a subscription for all the call/dialog states, state changes will be updated through NOTIFYs, a response code is sent for the initial REFER only after the call is connected, and the subscription will be explicitly terminated when the called resource becomes unavailable.

TABLE 5

```
SERVICE sip:1111@phones.example.com SIP/2.0
From: User B <userB@example.com>;tag=??
To: <sip:1111@phones.example.com>
Call-ID: ??@userB-pc.example.com
CSeq: 1 SERVICE
Contact: <sip:userB@userB-pc.example.com>
Content-Type: ??
<SOAP-ENV:Envelope
  xmlns:SOAP-ENV= "http://schemas.xmlsoap.org/soap/envelope/"
  SOAP-ENV:encodingStyle=
  "http://schemas.xmlsoap.org/soap/encoding/">
    <SOAP-ENV: Body>
      <xs323:SetHookSwitchStatus
        xmlns:xs323="http://www.ecma.ch/standards/ecma-323/csta">
          <hookswitch>1</hookswitch>
          <hookswitchOnHook>0</hookswitchOnHook>
      </xs323:SetHookSwitchStatus>
    </SOAP-ENV:Body>
</SOAP-ENV: Envelope>
SIP/2.0 200 OK
From: User B <userB@example.com>;tag=??
To: <sip:1111@phones.example.com>;tag=??
Call-ID: ad3@userB-pc.example.com
CSeq: 1 SERVICE
Contact: ??
NOTIFY sip:userB@userB-pc.example.com SIP/2.0
From: User B <userB@example.com>;tag=ad1
To: <sip:1111@phones.example.com>;tag=pd1
Call-ID: ad1@userB-pc.example.com
CSeq: 101 NOTIFY
Event: phone-device
Subscription-State: ??;expires=??
Contact: ??
Contact-Type: application/phone-info+xml
Device State XML Doc showing spkr phone = on
REFER sip:1111@phones.example.com SIP/2.0
From: User B <userB@example.com>;tag=ad2
To: <sip:1111@phones.example.com>;tag=pd2
Call-ID: ad2@userB-pc.example.com
CSeq: 1 REFER
Contact: <sip:userB@userB-pc.example.com>
Refer-To: <tel:555-1212>;method=INVITE
Content-Type: ??
REFER sip:1111@phones.example.com SIP/2.0
From: User B <userB@example.com>;tag=555555
To: <sip:1111@phones.example.com>
Call-ID: ad3@userB-pc.example.com
CSeq: 1 REFER
Contact: <sip:userB@userB-pc.example.com>
Refer-To: <tel:555-1212>;method=INVITE
Referred-By: ??
Content-Type: ??
SIP/2.0 100 Trying
From: User B <userB@example.com>;tag=555555
To: <sip:1111@phones.example.com>;tag=666666
Call-ID: ad3@userB-pc.example.com
CSeq: 1 REFER
Contact: ??
SIP/2.0 202 Accepted
From: User B <userB@example.com>;tag=555555
To: <sip:1111@phones.example.com>;tag=666666
Call-ID: ad3@userB-pc.example.com
CSeq: 1 REFER
Contact: ??
NOTIFY sip:userB@userB-pc.example.com SIP/2.0
From: User B<userB@example.com>;tag=ad2
To: <sip:1111@phones. example.com>;tag=pd2
Call-ID: ad2@userB-pc.example.com
CSeq: 101 NOTIFY
Event: dialog
Subscription-State: ??;expires=??
Contact: ??
Contact-Type: application/dialog-info+xml
<?xml version= "1.0"?>
  <dialog-info xmlns= "urn:ietf:params:xml:ns:dialog-info"
               version= "4"
               state= "partial"
               entity= "sip:1111@phones.example.com">
```

TABLE 5-continued

```
    <dialog id= "0">
        local-uri=sip:1111@phones.example.com
        remote-uri=tel:555-1212
        call-id= "aaa@555-1111.example.com"
        local-tag= "123456"
        direction= "initiator">
      <state>trying</state>
    </dialog>
  </dialog-info>
NOTIFY sip:userB@userB-pc.example.com SIP/2.0
From: User B<userB@example.com>;tag=ad2
To: <sip:1111@phones. example.com>;tag=pd2
Call-ID: ad2@userB-pc.example.com
CSeq: 102 NOTIFY
Event: dialog
Subscription-State: ??;expires=??
Contact: ??
Contact-Type: application/dialog-info+xml
<?xml version= "1.0"?>
  <dialog-info xmlns= "urn:ietf:params:xml:ns:dialog-info"
               version= "4"
               state= "partial"
               entity= "sip:1111@phones.example.com">
    <dialog id= "0">
        local-uri=sip:1111@phones.example.com
        remote-uri=tel:555-1212
        call-id= "aaa@555-1111.example.com"
        local-tag= "123456"
        remote-tag= "654321"
        direction= "initiator">
      <state>early</state>
    </dialog>
  </dialog-info>
NOTIFY sip:userB@userB-pc.example.com SIP/2.0
From: User B<userB@example.com>;tag=ad2
To: <sip:1111@phones. example.com>;tag=pd2
Call-ID: ad2@userB-pc.example.com
CSeq: 103 NOTIFY
Event: dialog
Subscription-State: ??;expires=??
Contact: ??
Contact-Type: application/dialog-info+xml
<?xml version= "1.0"?>
  <dialog-info xmlns= "urn:ietf:params:xml:ns:dialog-info"
               version= "4"
               state= "partial"
               entity= "sip:1111@phones.example.com">
    <dialog id= "0">
        local-uri=sip:1111@phones.example.com
        remote-uri=tel:555-1212
        call-id= "aaa@555-1111.example.com"
        local-tag= "123456"
        remote-tag= "654321"
        direction= "initiator">
      <state>confirmed</state>
    </dialog>
  </dialog-info>
NOTIFY sip:userB@userB-pc.example.com SIP/2.0
From: User B<userB@example.com>;tag=555555
To: <sip:1111@phones. example.com>;tag=666666
Call-ID: ad3@userB-pc.example.com
CSeq: 100 NOTIFY
Event: refer
Subscription-State: terminated;reason=noresource;expires=0
Contact: message/sipfrag
SIP/2.0 200 OK
```

Table 6 illustrates the SIP call flow of a TDM phone 118 initiating a call. More specifically, Table 6 illustrates a client system "B" 106b initiating a call to client system "C" 106c using TDM phone 118b. As in FIG. 5, the SIP 200 OKs are not shown in response to the NOTIFYs.

TABLE 6

```
NOTIFY sip:userB@userB-pc.example.com SIP/2.0
From: User B <userB@example.com>;tag=ad1
```

TABLE 6-continued

```
To: <sip:1111@phones.example.com>;tag=pd1
Call-ID: ad1@userB-pc.example.com
CSeq: 101 NOTIFY
Event: phone-device
Subscription-State: ??;expires=??
Contact: ??
Contact-Type: application/phone-info+xml
Device State XML Doc showing off-hook/spkr phone
NOTIFY sip:userB@userB-pc.example.com SIP/2.0
From: User B<userB@example.com>;tag=ad2
To: <sip:1111@phones. example.com>;tag=pd2
Call-ID: ad2@userB-pc.example.com
CSeq: 101 NOTIFY
Event: dialog
Subscription-State: ??;expires=??
Contact: ??
Contact-Type: application/dialog-info+xml
<?xml version= "1.0"?>
  <dialog-info xmlns= "urn:ietf:params:xml:ns:dialog-info"
              version= "4"
              state= "partial"
              entity= "sip:1111@phones.example.com">
    <dialog id= "0"
           local-uri=sip:1111@phones.example.com
           remote-uri=tel:555-1212
           call-id= "aaa@555-1111.example.com"
           local-tag= "123456"
           direction= "initiator">
      <state>trying</state>
    </dialog>
  </dialog-info>
NOTIFY sip:userB@userB-pc.example.com SIP/2.0
From: User B<userB@example.com>;tag=ad2
To: <sip:1111@phones. example.com>;tag=pd2
Call-ID: ad2@userB-pc.example.com
CSeq: 102 NOTIFY
Event: dialog
Subscription-State: ??;expires=??
Contact: ??
Contact-Type: application/dialog-info+xml
<?xml version= "1.0"?>
  <dialog-info xmlns= "urn:ietf:params:xml:ns:dialog-info"
              version= "4"
              state= "partial"
              entity= "sip:1111@phones.example.com">
    <dialog id= "0"
           local-uri=sip:1111@phones.example.com
           remote-uri=tel:555-1212
           call-id= "aaa@555-1111.example.com"
           local-tag= "123456"
           remote-tag= "654321"
           direction= "initiator">
      <state>early</state>
    </dialog>
  </dialog-info>
NOTIFY sip:userB@userB-pc.example.com SIP/2.0
From: User B<userB@example.com>;tag=ad2
To: <sip:1111@phones. example.com>;tag=pd2
Call-ID: ad2@userB-pc.example.com
CSeq: 103 NOTIFY
Event: dialog
Subscription-State: ??;expires=??
Contact: ??
Contact-Type: application/dialog-info+xml
<?xml version= "1.0"?>
  <dialog-info xmlns= "urn:ietf:params:xml:ns:dialog-info"
              version= "4"
              state= "partial"
              entity= "sip:1111@phones.example.com">
    <dialog id= "0"
           local-uri=sip:1111@phones.example.com
           remote-uri=tel:555-1212
           call-id= "aaa@555-1111.example.com"
           local-tag= "123456"
           remote-tag= "654321"
           direction= "initiator">
      <state>confirmed</state>
    </dialog>
  </dialog-info>
```

Table 7 illustrates the SIP call flow of a client system 106 disconnecting from a call. Two scenarios exist for such a call. In the first scenario, the call may be initiated by the client system 106. In the second scenario, the call may be initiated by a TDM phone 118. In either scenario, the client system 106 possesses the dialog identifier for the call to be disconnected. If the call was initiated by the client system 106, then a dialog was created via the SIP REFER message, but the dialog was terminated when the other party successfully responded to the INVITE message.

TABLE 7

```
REFER sip:1111@phones.example.com SIP/2.0
From: User B <userB@example.com>;tag=555555
To: <sip:1111@phones.example.com>
Call-ID: ad3@userB-pc.example.com
CSeq: 1 REFER
Contact: <sip:userB@userB-pc.example.com>
Refer-To: <tel:555-1212>;method=BYE?
          local-uri=sip:1111@phones.example.com;tag=123456
          &remote-uri=tel:555-1212;tag=654321
          &Call-Id=aaa@555-1111.example.com
Referred-By: ??
Content-Type: ??
NOTIFY sip:userB@userB-pc.example.com SIP/2.0
From: User B<userB@example.com>;tag=555555
To: <sip:1111@phones. example.com>;tag=666666
Call-ID: ad3@userB-pc.example.com
CSeq: 100 NOTIFY
Event: refer
Subscription-State: terminated;expires=??
Contact-Type: message/sipfrag
SIP/2.0 200 OK
NOTIFY sip:userB@userB-pc.example.com SIP/2.0
From: User B<userB@example.com>;tag=ad2
To: <sip:1111@phones. example.com>;tag=pd2
Call-ID: ad2@userB-pc.example.com
CSeq: 103 NOTIFY
Event: dialog
Subscription-State: ??;expires=??
Contact: ??
Contact-Type: application/dialog-info+xml
<?xml version= "1.0"?>
  <dialog-info xmlns= "urn:ietf:params:xml:ns:dialog-info"
              version= "4"
              state= "partial"
              entity= "sip:1111@phones.example.com">
    <dialog id= "0"
           local-uri=sip:1111@phones.example.com
           remote-uri=tel:555-1212
           call-id= "aaa@555-1111.example.com"
           local-tag= "123456"
           remote-tag= "654321"
           direction= "initiator">
      <state>terminated</state>
    </dialog>
  </dialog-info>
SERVICE sip:1111@phones.example.com SIP/2.0
From: User B <userB@example.com>;tag=??
To: <sip:1111@phones.example.com>
Call-ID: ??@userB-pc.example.com
CSeq: 1 SERVICE
Contact: <sip:userB@userB-pc.example.com>
Content-Type: ??
<SOAP-ENV:Envelope
  xmlns:SOAP-ENV= "http://schemas.xmlsoap.org/soap/envelope/"
  SOAP-ENV:encodingStyle=
  "http://schemas.xmlsoap.org/soap/encoding/">
  <SOAP-ENV: Body>
    <xs323:SetHookSwitchStatus
      xmlns:xs323= "http://www.ecma.ch/standards/ecma-323/csta">
      <hookswitch>1</hookswitch>
      <hookswitchOnHook>1</hookswitchOnHook>
    </xs323:SetHookSwitchStatus>
  </SOAP-ENV:Body>
</SOAP-ENV: Envelope>
```

Table 8 illustrates the SIP call flow of a client system 106 accepting a call. Once an incoming call arrives (i.e., the INVITE message or signaling for the call is received), the client system 106 sends a "trying" state NOTIFY message to the originator of the call.

TABLE 8

NOTIFY sip:userB@userB-pc.example.com SIP/2.0
From: User B <userB@example.com>;tag=ad2
To: <sip:1111@phones.example.com>;tag=pd2
Call-ID: ad2@userB-pc.example.com
CSeq: 101 NOTIFY
Event: dialog
Subscription-State: ??;expires=??
Contact: ??
Contact-Type: application/dialog-info+xml
<?xml version= "1.0"?>
  <dialog-info xmlns= "urn:ietf:params:xml:ns:dialog-info"
          version= "4"
          state= "partial"
          entity= "sip:1111@phones.example.com">
    <dialog id= "0"
        local-uri=sip:1111@phones.example.com
        remote-uri=tel:555-1212
        call-id= "aaa@555-1111.example.com"
        remote-tag= "654321"
        direction= "recipient">
    <state>trying</state>
    </dialog>
  </dialog-info>
NOTIFY sip:userB@userB-pc.example.com SIP/2.0
From: User B<userB@example.com>;tag=ad2
To: <sip:1111@phones. example.com>;tag=pd2
Call-ID: ad2@userB-pc.example.com
CSeq: 102 NOTIFY
Event: dialog
Subscription-State: ??;expires=??
Contact: ??
Contact-Type: application/dialog-info+xml
<?xml version= "1.0"?>
  <dialog-info xmlns= "urn:ietf:params:xml:ns:dialog-info"
          version= "4"
          state= "partial"
          entity= "sip:1111@phones.example.com">
    <dialog id= "0"
        local-uri=sip:1111@phones.example.com
        remote-uri=tel:555-1212
        call-id= "aaa@555-1111.example.com"
        local-tag= "123456"
        remote-tag= "654321"
        direction= "recipient">
    <state>early</state>
    </dialog>
  </dialog-info>
REFER sip:1111@phones.example.com SIP/2.0
From: User B <userB@example.com>;tag=555555
To: <sip:1111@phones.example.com>
Call-ID: ad3@userB-pc.example.com
CSeq: 1 REFER
Contact: <sip:userB@userB-pc.example.com>
Refer-To: <tel:555-1212>;method=OK?
        To= "sip:1111@phones.example.com;tag=123456"
        &From= "tel:555-1212;tag=654321"
        &Call-Id=aaa@555-1111.example.com
Content-Type: ??
NOTIFY sip:userB@userB-pc.example.com SIP/2.0
From: User B<userB@example.com>;tag=ad2
To: <sip:1111@phones. example.com>;tag=pd2
Call-ID: ad2@userB-pc.example.com
CSeq: 103 NOTIFY
Event: dialog
Subscription-State: ??;expires=??
Contact: ??
Contact-Type: application/dialog-info+xml
<?xml version= "1.0"?>
  <dialog-info xmlns= "urn:ietf:params:xml:ns:dialog-info"
          version= "4"
          state= "partial"
          entity= "sip:1111@phones.example.com">

TABLE 8-continued

<dialog id= "0"
        local-uri=sip:1111@phones.example.com
        remote-uri=tel:555-1212
        call-id= "aaa@555-1111.example.com"
        local-tag= "123456"
        remote-tag= "654321"
        direction= "recipient">
    <state>confirmed</state>
    </dialog>
  </dialog-info>
SERVICE sip:1111@phones.example.com SIP/2.0
From: User B <userB@example.com>;tag=??
To: <sip:1111@phones.example.com>
Call-ID: ??@userB-pc.example.com
CSeq: 1 SERVICE
Contact: <sip:userB@userB-pc.example.com>
Content-Type: ??
NOTIFY sip:userB@userB-pc.example.com SIP/2.0
From: User B<userB@example.com>;tag=ad1
To: <sip:1111@phones. example.com>;tag=pd1
Call-ID: ad1@userB-pc.example.com
CSeq: 101 NOTIFY
Event: phone-device
Subscription-State: ??;expires=??
Contact: ??
Contact-Type: application/phone-info+xml
Device State XML Doc showing spkr phone = on

One skilled in the art will recognize that other call flows exist for additional monitoring and controlling situations such as, but not limited to, declining a call, indicating a busy line, forwarding a call, disconnecting a call from the client system 106, disconnecting a call from a TDM phone 118, putting a call on hold by the client system 106, putting a call on hold from a TDM phone 118, transferring a call, retrieving a call, conference calling, sending DTMF, and gathering digits that are physically entered into the TDM phone 118 keypad. Each of these situations requires SIP messages similar to those described in the tables above.

Figure 4A:
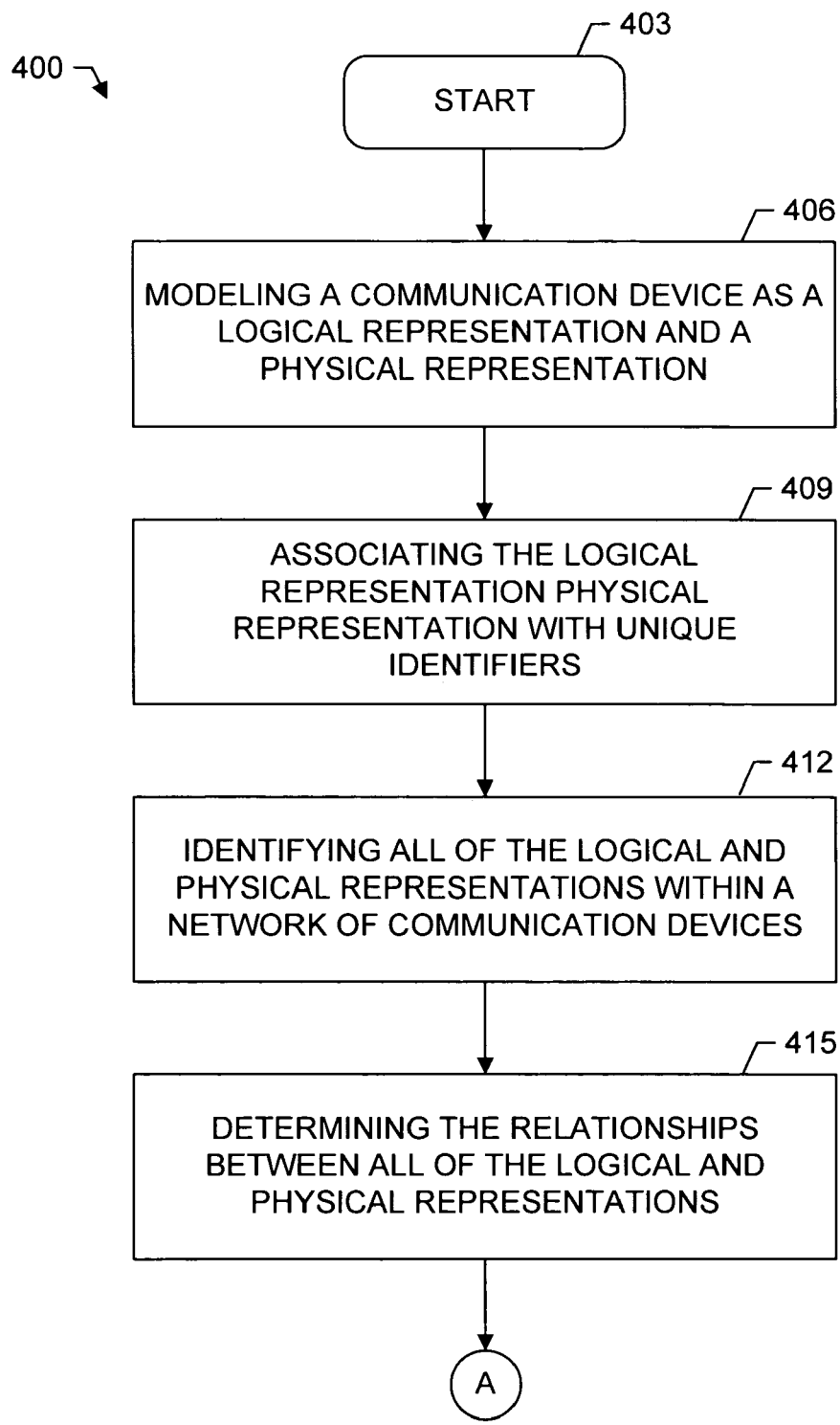
FIGS. 4A-4B display a flowchart representation of a method of controlling and monitoring a communication device in accordance with the exemplary embodiment of the present invention.
Figure 4B:
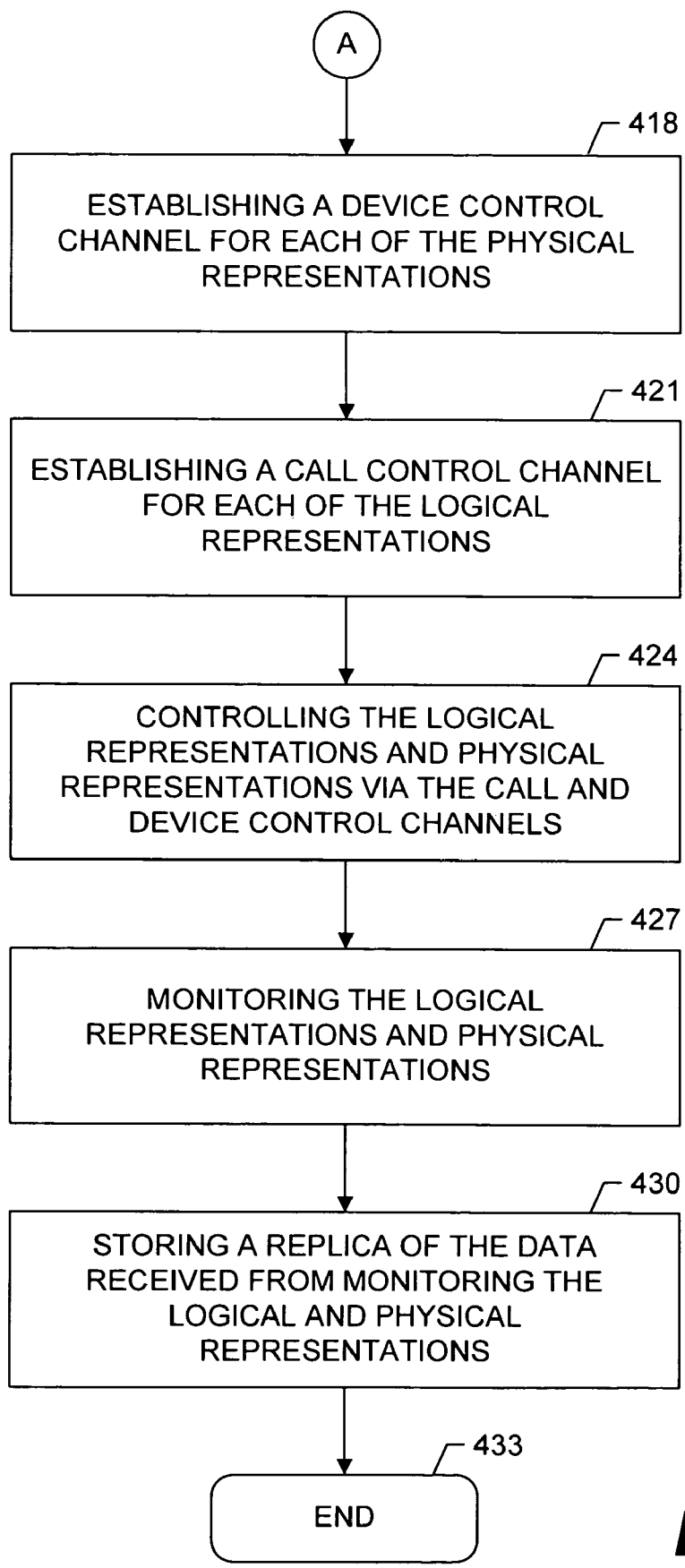

FIGS. 4A-4B display a flowchart representation of a method 400 of controlling and monitoring a communication device 118, 128 in accordance with the exemplary embodiment of the present invention. In order for a user to effectively control and monitor a communication device 118, 128, an appropriate environment 100 and third-party call control system 300 must be present. The present invention models each communication device 118, 128 into two distinct representations for controlling and monitoring the physical attributes of the communication device 118, 128 and the changing states of the call and/or line of the communication device 118, 128.

To effectively monitor and control a communication device 118, 128, the third-party call control application 303 recognizes a communication device 118, 128 as two separate representations. Accordingly, after starting at step 403, the third-party call control application 303 proceeds to step 406 where a logical representation 324 and a physical representation 321 are established for the communication device 118, 128. The logical representation 324 represents the call and/or line associated with the communication device 118, 128 and, therefore, enables the offering of call/line services to client systems 106. The physical representation 321 represents the physical attributes of the communication device 118, 128 and, therefore, enables the offering of user interaction between the communication device 118, 128 and the client system 106.

To explicitly target these two representations, the third-party call control application 303 must be able to uniquely address them and, therefore, proceeds to step 409 where the logical representation 324 and the physical representation 321 of each communication device 118, 128 is associated with a unique identifier. More particularly, each logical representation 324 and each physical representation 324 is associated with a SIP URI, thereby enabling a client system 106 to send SIP messages to a uniquely identified communication device 118, 128.

In order to associate each logical representation 324 and each physical representation 321 of each communication device 118, 128 with a unique identifier, all of the communication devices 118, 128 (i.e., and thus all of the logical representations 324 and physical representations 321 thereof) must be identified. To do so, the third-party call control application 203 proceeds to step 412 where all of the logical representations 324 and physical representations 321 within a network sub-hierarchy 103 are identified. For example and not limitation, identification of all of the communication devices 118, 128 may be accomplished by scanning a network directory of a client system 106. An acceptable network directory comprises the "ACTIVE DIRECTORY®" provided by operating system software of Microsoft Corporation of Redmond, Wash.

Next, the third-party call control application 303 proceeds to step 415 where all of the relationships between all of the identified communication devices 118, 128 are determined. More specifically, the third-party call control application 303 determines the relationships and/or mappings between the communication devices 118, 128 (i.e., the TDM phone 118 and the SIP phone 128), lines, and users of the client systems 106. Such determinations may also be accomplished via use of a network directory.

The third-party call control application 303 then proceeds to step 418 where the controller unit 312 and the monitoring unit 309 each establish a device control channel 327 to the physical representation 321 of all the communication devices 118, 128. As described above, a device control channel 327 is created by establishing a SIP dialog session with the communication device 118, 128.

Next, at step 421, the controller unit 312 and the monitoring unit 309 each establish a call control channel 330 to the logical representation 324 of all the communication devices 118, 128. A call control channel 330 is created by establishing a SIP dialog session with the communication device 118, 128.

At step 424, the controller unit 312 directs operation of the logical representations 324 and the physical representations 321 of the communication devices 118, 128 by sending SIP messages over the call and device control channels 327. As described above with reference to FIG. 3, SIP messages may be used to control the call/line and physical attributes of the communication device 118, 128.

Continuing at step 427, the monitoring unit 309 monitors the logical representations 324 and the physical representations 321 of the communication devices 118, 128 by sending SIP messages over the call and device control channels 330, 327. By utilizing SIP inquiries, the monitoring unit 309 determines the current state of the communication device 118, 128 within the network sub-hierarchy 103. In an exemplary embodiment of the present invention, steps 424 and 427 occur in a substantially simultaneous manner.

Subsequently, at step 430, the monitoring unit 309 provides data that represents the current state of a communication device 118, 128 to the entity replica storage unit 318 for storage therein. The data may then be used to inform a user, through the user interface 315, about the state of a particular communication device 118, 128. The third-party call control application 303 then terminates operation in accordance with method 400 at step 433.

Figure 5A:
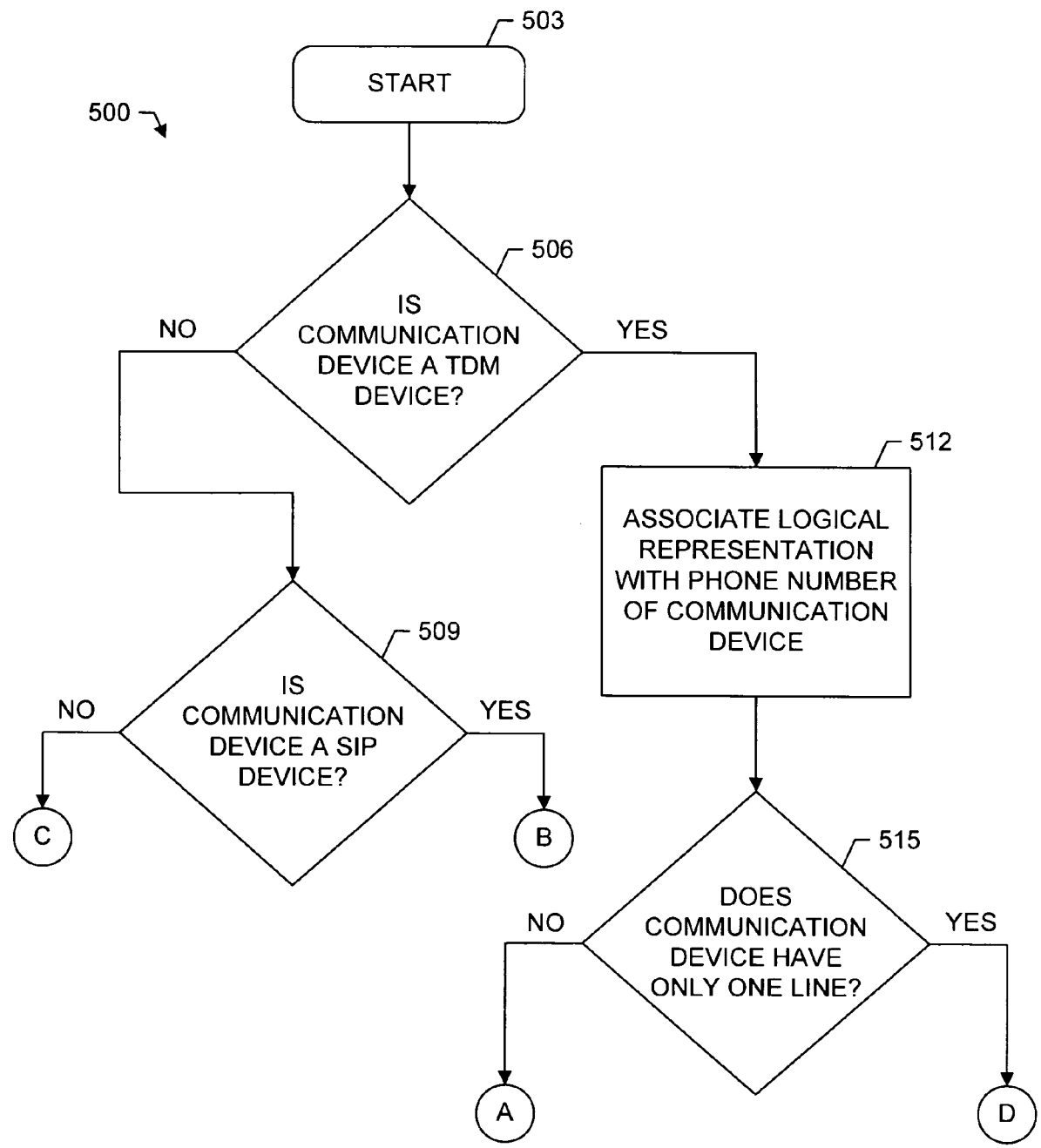
FIGS. 5A-5B display a flowchart representation of a method of associating a logical representation of a communication device and a physical representation of a communication device with unique identifiers in accordance with the exemplary embodiment of the present invention.
Figure 5B:
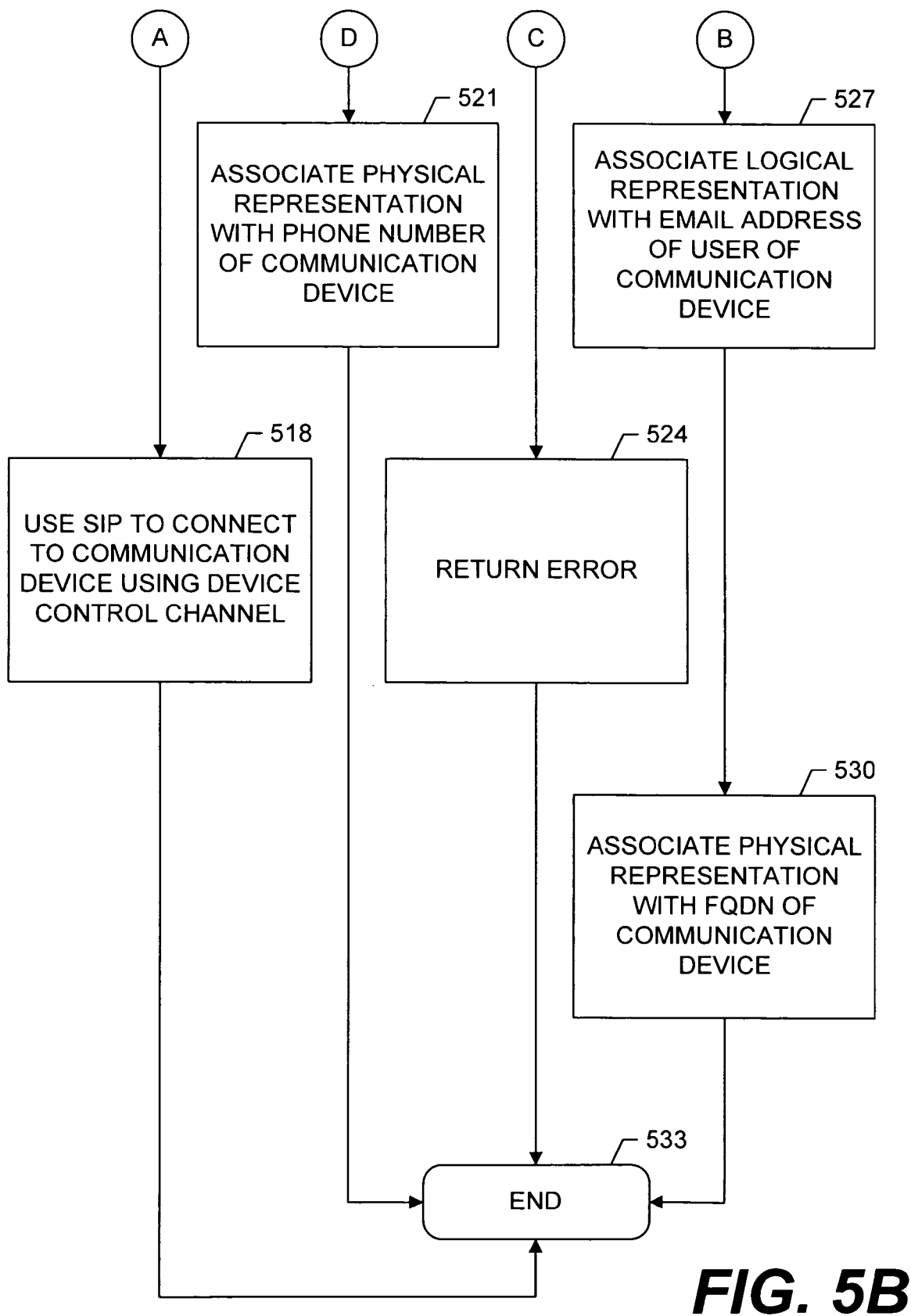

FIGS. 5A-5B display a flowchart representation of a method 500 of associating a logical representation 324 of a communication device 118, 128 and a physical representation 321 of a communication device 118, 128 with unique identifiers in accordance with the exemplary embodiment of the present invention. In order for the third-party call control application 303 to properly address the logical representation 324 and the physical representation 321 of a communication device 118, 128 via SIP messaging, a unique identifier is assigned to each logical representation 324 and each physical representation 321. Preferably, the unique identifier comprises a SIP URI.

After starting at step 503, the third-party call control application 303 proceeds to step 506 where the third-party call control application 303 determines if the communication device 118, 128 is a TDM-type device. If at step 506, the third-party call control application 303 determines that the communication device 118, 128 is a TDM-type device, then the third-party call control application 303 proceeds to step 512 and associates the logical representation 324 with the phone number of the communication device 118, 128. The third-party call control application 303 then proceeds to step 515 described below.

If at step 506, however, the third-party call control application 303 determines that the communication device 118, 128 is not a TDM-type device, then the third-party call control application 303 proceeds to step 509 where the third-party call control application 303 determines whether the communication device 118, 128 is a SIP-type device. If, at 509, the third-party call control application 303 determines that the communication device 118, 128 is a SIP-type device, then the third-party call control application 303 proceeds to step 527 where the logical representation 324 is associated with the email address of the user of the communication device 118, 128. The third-party call control application 303 then proceeds to step 530 where the physical representation 321 is associated with the fully qualified domain name (FQDN) of the communication device 118, 128. The third-party call control application 303 then ends operation in accordance with method 500 at step 533.

If at step 509, however, the third-party call control application 303 determines that the communication device 118, 128 is not a SIP-type device, then the third-party call control application 303 proceeds to step 524 where an error is generated. The third-party call control application 303 then ends operation in accordance with method 500 at step 533.

At step 515, the third-party call control application 303 determines whether the communication device 118, 128 has only one line. If, at step 515, the third-party call control application 303 determines that the communication device 118, 128 has only one line, then the third-party call control application 303 proceeds to step 521 where the physical representation 321 is associated with the phone number of the communication device 118, 128. The third-party call control application 303 then ends operation in accordance with method 500 at step 533.

If at step 515, however, the third-party call control application 303 determines that the communication device 118, 128 has more than one line, then the third-party call control application 303 proceeds to step 518 where the device control channel 327 is used to connect to the communication device 118, 128. The third-party call control application 303 then ends operation in accordance with method 500 at step 533.

Figure 6A:
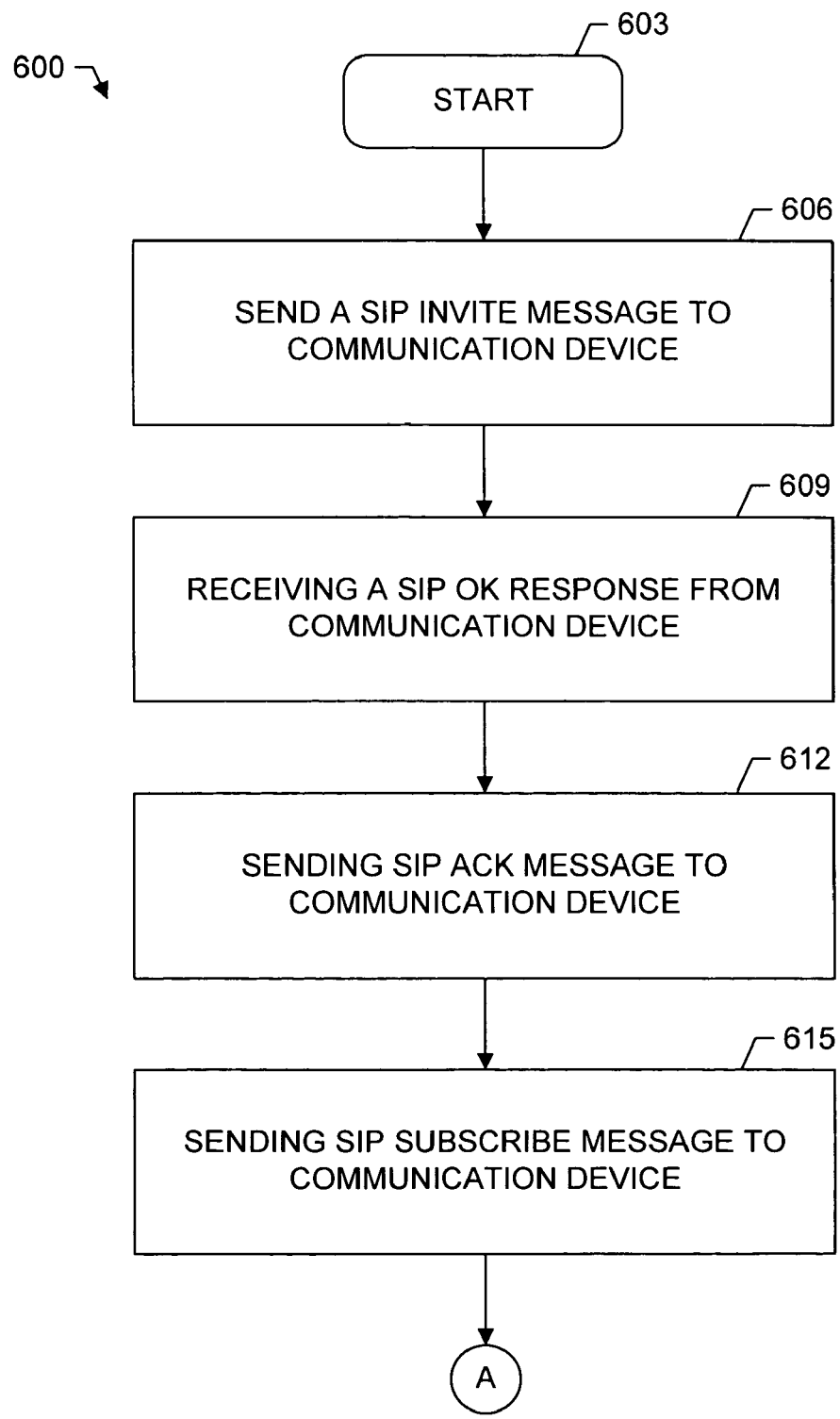
FIGS. 6A-6B display a flowchart representation of a method of establishing a device control channel with a physical representation of a communication device in accordance with the exemplary embodiment of the present invention.
Figure 6B:
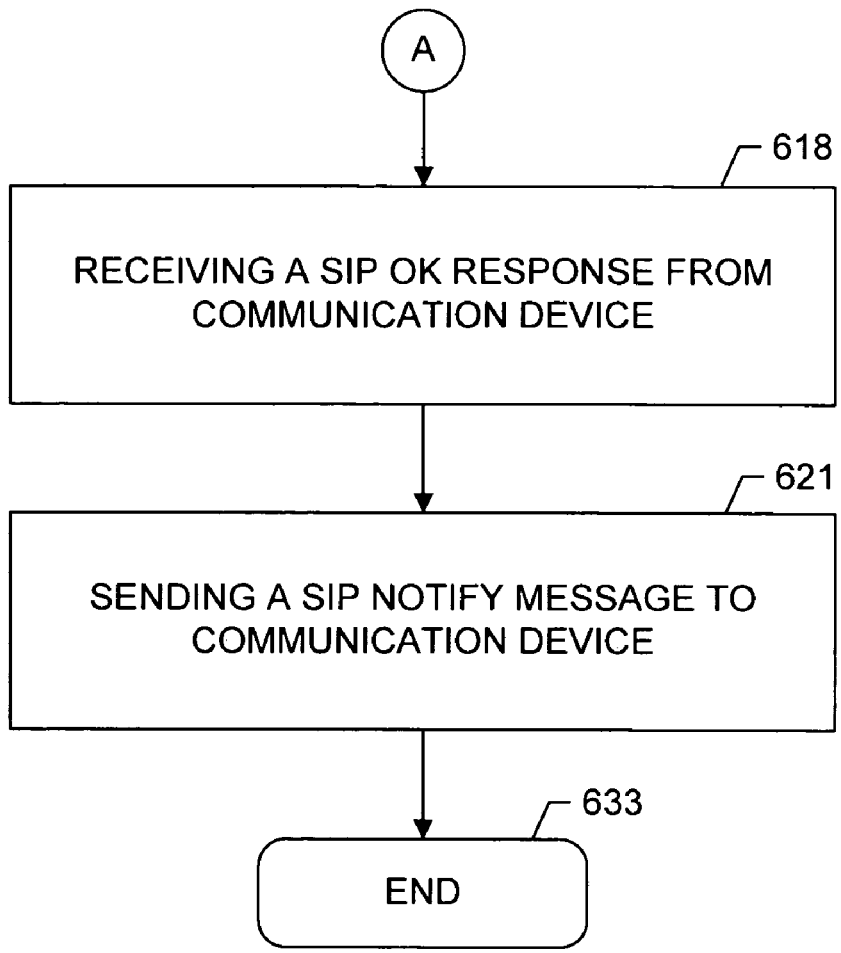

FIGS. 6A-6B display a flowchart representation of a method 600 of establishing a device control channel 327 with a physical representation 321 of a communication device 118, 128 in accordance with the exemplary embodiment of the present invention. To properly control and monitor the physical representation 321 of the communication device 118, 128, the controller unit 312 and the monitoring unit 309 need to create a communication channel to the physical representation 321. Although the description of FIGS. 6A-6B only describe the controller unit 312 establishing a device control channel 327 to the physical representation 321 of the communication device 118, 128, the monitoring unit 309 also creates a device control channel 327 to the physical representation 321 of the communication device 118, 128, following substantially the same method 600.

After starting at step 603, the controller unit 312 proceeds to step 606 where the controller unit 312 sends a SIP INVITE message to the physical representation 321 of the communication device 118, 128. The SIP INVITE message attempts to create a communications session between the controller unit 312 and the physical representation 321. Next, at step 609, the controller unit 312 receives a SIP OK response from the physical representation 321 of the communication device 118, 128. The SIP OK response provides notification that the physical representation 321 of the communication device 118, 128 has accepted the invitation to the communications session. At step 612, the controller unit 312 sends a SIP ACK message to the physical representation 321 of the communication device 118, 119. The SIP ACK message is to acknowledge receipt of the acceptance by the physical representation 321 to establish a communications session.

By accepting the invitation to the communications session, the physical representation 321 notifies the controller unit 312 that the physical representation 321 supports an appropriate SIP phone-device package. Accordingly, at step 615, the controller unit 312 sends a SIP SUBSCRIBE message to the physical representation 321 of the communication device 118, 128. The SIP SUBSCRIBE message indicates that the controller unit 312 desires to subscribe or utilize the SIP phone-device package to control the physical attributes of the communication device 118, 128.

Next, at step 618, the controller unit 312 receives a SIP OK message from the physical representation 321 of the communication device 118, 128. The SIP OK message indicates to the controller unit 312 that the physical representation 321 is allowing the establishment of the device control channel 327.

At step 621, the controller unit 312 sends the physical representation 321 of the communication device 118, 128 a SIP NOTIFY message. The SIP NOTIFY message enables the establishment of the device control channel 327 between the controller unit 312 and the physical representation 321 of the communication device 118, 128. Typically, the SIP NOTIFY message includes XML code that assists in establishing the device control channel 327. The controller unit 312 then ends operation in accordance with method 600 at step 633.

Figure 7A:
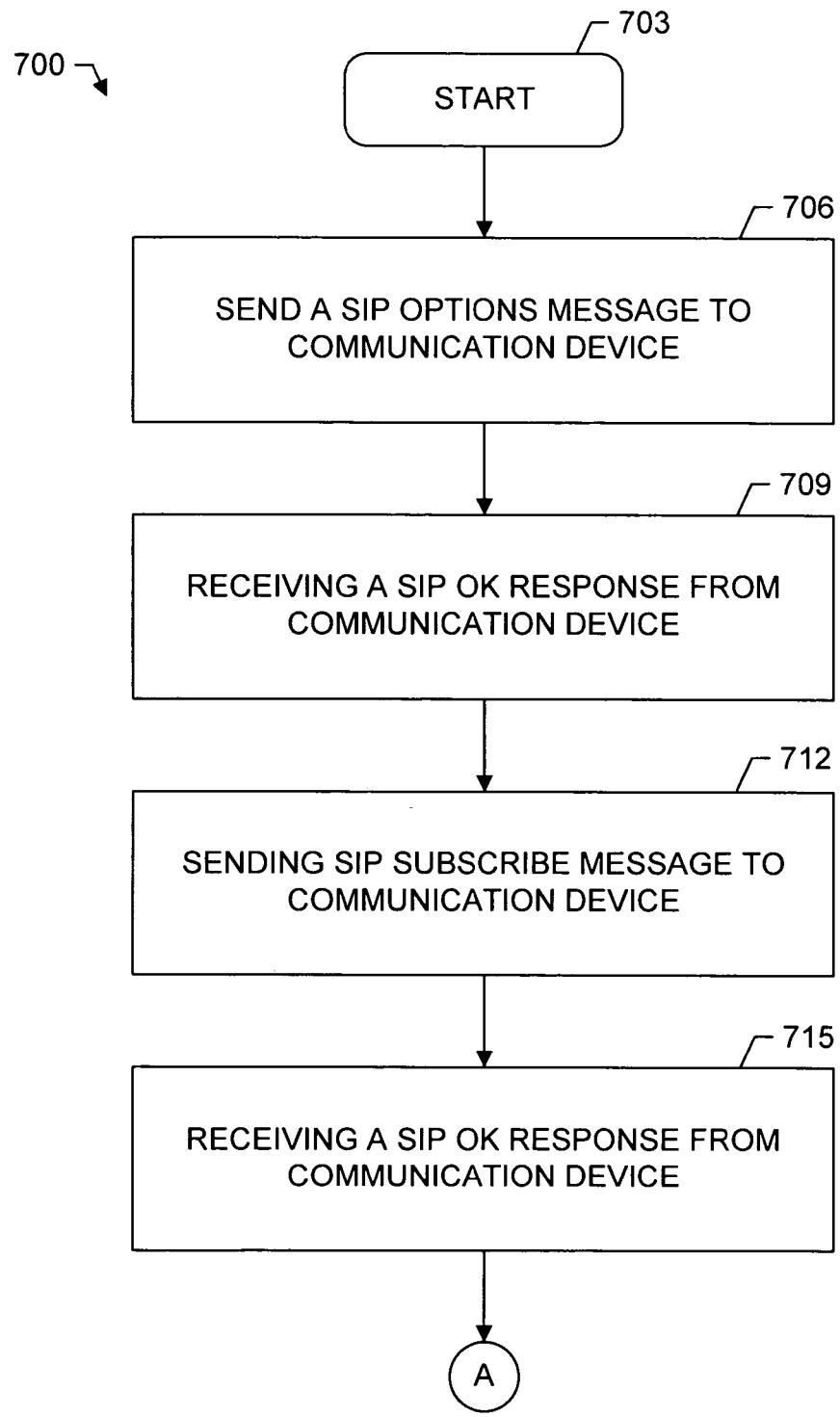
FIGS. 7A-7B display a flowchart representation of a method of establishing a call control channel with a logical representation of a communication device in accordance with the exemplary embodiment of the present invention.
Figure 7B:
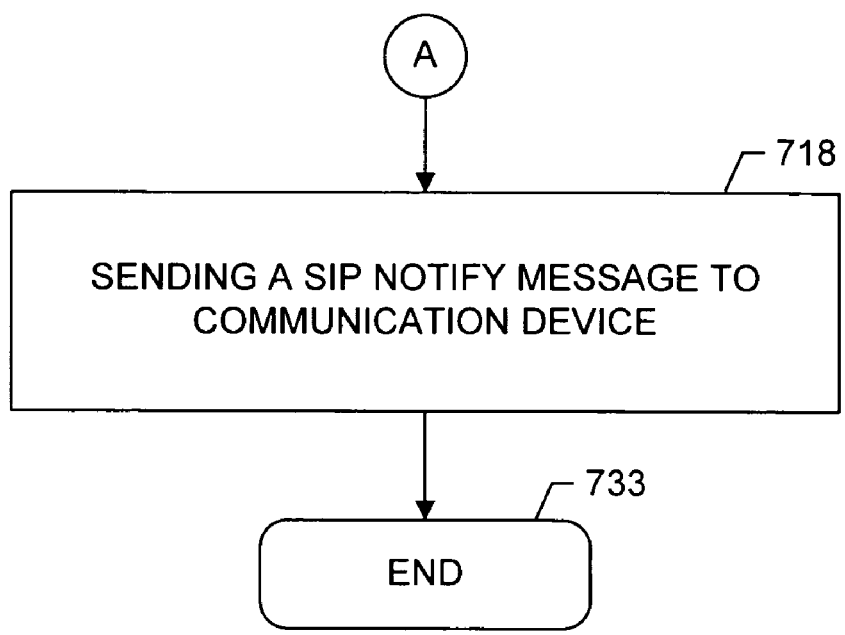

FIGS. 7A-7B display a flowchart representation of a method 700 of establishing a call control channel 330 with a logical representation 324 of a communication device 118, 128 in accordance with the exemplary embodiment of the present invention. To properly control and monitor the logical representation 324 of the communication device 118, 128, the controller unit 312 and the monitoring unit 309 must create a communication channel 330 to the logical representation 324. Although the description of FIGS. 7A-7B only describe the controller unit 312 establishing a call control channel 330 to the logical representation 324 of the communication device 118, 128, the monitoring unit 309 also creates a call control channel 330 to the logical representation 324 of the communication device 118, 128, following substantially the same method 700.

After starting at step 703, the controller unit 312 proceeds to step 706 where the controller unit 312 sends a SIP OPTIONS message to the logical representation 324 of the communication device 118, 128. The SIP OPTIONS message inquires as to the type of SIP calls that the logical representation 324 of the communication device 118, 128 supports. Next, at step 709, the controller unit 312 receives a SIP OK response from the logical representation 324 of the communication device 118, 128. The SIP OK response indicates to the controller unit 312 the types of SIP calls supported by the logical representation 324 of the communication device 118, 128.

By responding to the SIP OPTIONS message, the logical representation 324 notifies the controller unit 312 that the logical representation 324 supports SIP messaging. Additionally, the logical representation 324 has identified supported SIP calls. Accordingly, at step 712, the controller unit 312 sends a SIP SUBSCRIBE message to the logical representation 324 of the communication device 118, 119. The SIP SUBSCRIBE message indicates that the controller unit 312 desires to subscribe or utilize the supported SIP calls to control the line and/or call services of the communication device 118, 128.

Next, at step 715, the controller unit 312 receives a SIP OK message from the logical representation 324 of the communication device 118, 128. The SIP OK message indicates to the controller unit 312 that the logical representation 324 is allowing the establishment of the call control channel 330.

At step 718, the controller unit 312 sends the logical representation 324 of the communication device 118, 128 a SIP NOTIFY message. The SIP NOTIFY message enables the establishment of the call control channel 330 between the controller unit 312 and the logical representation 324 of the communication device 118, 128. Preferably, the SIP NOTIFY message includes XML code that assists in establishing the call control channel 330. The controller unit 312 then ends operation in accordance with method 700 at step 733.

Whereas the present invention has been described in detail it is understood that variations and modifications can be effected within the spirit and scope of the invention, as described herein before and as defined in the appended claims. The corresponding structures, materials, acts, and equivalents of all mean-plus-function elements, if any, in the claims below are intended to include any structure, material, or acts for performing the functions in combination with other claimed elements as specifically claimed.

What is claimed is:

1. A method of controlling and monitoring via client systems calls placed through telephony devices, each telephony device being a time division multiplexing ("TDM") telephone and having a unique identifier, the method comprising:

providing a plurality of the client systems and the telephony devices within a communication network, each of the client systems having a unique identifier and hardware and software components that provide a user interface for controlling a telephony device, a client system for controlling a telephony device using SIP, the plurality of the client systems being communicatively connected in a group;

for each of the telephony devices, providing a logical representation and a physical representation for the telephony device, the logical representation for the telephony device representing a communication link of the telephony device, the physical representation of the telephony device representing physical attributes of the telephony device;

determining relationships between the client systems and the telephony devices based on their unique identifiers, a relationship indicating that a client system is to control a telephony device via the logical representation and the physical representation of the telephony device;

for each relationship between a client system and a telephony device, establishing a device control channel between the physical representation of the telephony device and the client system, the device control channel being through a private branch exchange that supports a computer telephony integration ("CTI") protocol and a front end that converts messages between the SIP and the CTI protocol; and establishing a call control channel between the logical representation of the telephony device and the client system, the call control channel being through the private branch exchange that supports the CTI protocol and the front end that converts messages between the SIP and the CTI protocol, the call control channel being different from the device control channel; and under control of the user interface of each client system that has a relationship with a telephony device, controlling the telephony device, via the logical representation by sending SIP messages using the call control channel and via the physical representation by sending SIP messages using the device control channel, to place calls via the telephony device; and monitoring the telephony device via the logical representation using the call control channel and via the physical representation using the device control channel to receive calls via the telephony device.

2. The method of claim 1 wherein further comprising associating the logical representation and the physical representation of the telephony device with a phone number of the telephony device.

3. The method of claim 1 wherein the determining of the relationships between the telephony devices and the client systems includes searching a network directory for a listing of the telephony devices within the communication network.

4. The method of claim 1 wherein the establishing the device control channel between the physical representation of the telephony device and the a client system and comprises:

sending a SIP INVITE message from the client system to the physical representation of the telephony device;

receiving a SIP OK response sent from the physical representation of the telephony device to the client system;

sending a SIP acknowledgement (ACK) message from the client system to the physical representation of the telephony device in response to receiving the SIP OK response; and sending a SIP SUBSCRIBE message from the client system to the physical representation of the telephony device;

receiving a SIP OK response sent from the physical representation of the telephony device to the client system; and receiving a SIP NOTIFY message from the physical representation of the telephony device to the client system to notify the client device of changes in the status of a physical attribute of the telephony device.

5. The method of claim 1 wherein the establishing a the call control channel between the logical representation of the telephony device and the client system comprises:

sending a SIP OPTION message from the client system to the logical representation of the telephony device;

receiving a SIP OK response sent from the logical representation of the telephony device to the client system;

sending a SIP SUBSCRIBE message from the client system to the logical representation of the telephony device;

receiving a SIP OK response sent from the logical representation of the telephony device to the client system; and receiving a SIP NOTIFY message from the logical representation of the telephony device to the client system to notify the client device of changes in the status of communication link of the telephony device.

6. A computer-readable storage device that is not a signal containing instructions for each of a plurality of client systems, a client system for controlling and monitoring calls placed through a first telephony device of a communication network, the client system having hardware and software components that provide a user interface for controlling the first telephony device, the first telephony device being a time division multiplexing ("TDM") telephone, the first telephony device having a logical representation and a physical representation for the first telephony device, the logical representation for the first telephony device representing a communication link of the first telephony device, the physical representation of the first telephony device representing physical attributes of the first telephony device, by a method comprising:

determining a relationship between the client system and the first telephony device;

establishing a device control channel between the physical representation of the first telephony device and the client system, the device control channel being through a private branch exchange that supports a computer telephony integration ("CTI") protocol and a front end that converts messages between a session initiation protocol ("SIP") and the CTI protocol;

establishing a call control channel between the logical representation of the first telephony device and the client system, the call control channel being through the private branch exchange that supports the CTI protocol and the front end that converts messages between the SIP and the CTI protocol;

under control of the user interface of the client system, controlling the first telephony device, via the logical representation by sending SIP messages using the call control channel and via the physical representation by sending SIP messages using the device control channel, to place a call; and monitoring the first telephony device via the logical representation using the call control channel and via the physical representation using the device control channel.

7. The computer-readable storage device of claim 6 wherein the first telephony device is a SIP-enabled telephone or the TDM telephone and including when the first telephony device is the TDM telephone, associating the logical representation and the physical representation of the first telephony device with a phone number of the telephony device; and when the first telephony device is the SIP-enabled telephone, associating the logical representation of the first telephony device with an electronic mail address; and associating the physical representation of the first telephony device with a fully qualified domain name.

8. The computer-readable storage medium of claim 7 wherein the determining of the relationships between the first telephony device and the client system includes searching a network directory for a listing of the first telephony device within the communication network.

9. The computer-readable storage device of claim 6 wherein the establishing of the device control channel between the client system and the first telephony device comprises:
- sending a SIP INVITE message from the client system to the physical representation of the first telephony device;
- receiving a SIP OK response sent from the physical representation of the first telephony device to the client system;
- sending a SIP acknowledgement (ACK) message from the client system to the physical representation of the first telephony device in response to receiving the SIP OK response; and
- sending a SIP SUBSCRIBE message from the client system to the physical representation of the first telephony device;
- receiving a SIP OK response sent from the physical representation of the first telephony device to the client system; and
- receiving a SIP NOTIFY message from the physical representation of the first telephony device to the client system to notify the client device of changes in the status of a physical attribute of the telephony device.

10. The computer-readable storage device of claim 9 wherein the establishing of the call control channel between the client system and the first telephony device comprises:
- sending a SIP OPTION message from the client system to the logical representation of the first telephony device;
- receiving a SIP OK response sent from the logical representation of the first telephony device to the client system;
- sending a SIP SUBSCRIBE message from the client system to the logical representation of the first telephony device;
- receiving a SIP OK response sent from the logical representation of the first telephony device to the client system; and
- receiving a SIP NOTIFY message from the logical representation of the first telephony device to the client system to notify the client device of changes in the status of communication link of the first telephony device.

11. The computer-readable storage device of claim 6 wherein the establishing of the device control channel includes establishing a first SIP session and establishing of the call control channel includes establishing a second SIP session that is different from the first SIP session.

12. A communication network comprising:
- a plurality of telephony devices, each telephony device being a time division multiplexing ("TDM") telephone each telephony device having a logical representation and a physical representation for the telephony device, the logical representation for each telephony device representing a communication link of the telephony device, the physical representation of each telephony device representing physical attributes of the telephony device; and
- a plurality of client systems, each client system having hardware and software components that provide a user interface for controlling a first telephony device of the plurality of the telephony devices, each client system for controlling and monitoring calls placed through the first telephony device by performing steps comprising:
  - determining a relationships between the client system and the first telephony device;
  - establishing a device control channel between the physical representation of the first telephony device and the client system, the device control channel being through a front end device for converting between session initiation protocol ("SIP") messages and computer telephony integration ("CTI") messages; and
  - establishing a call control channel between the logical representation of the first telephony device and the client system, the call control channel being through a front end device for converting between the SIP messages and the CTI messages; and
  - controlling the first telephony device via the logical representation using the call control channel and via the physical representation using the device control channel to place a call, the controlling being based on input of a user through the user interface of the client system; and
  - monitoring the first telephony device via the logical representation using the call control channel and via the physical representation using the device control channel.

13. The communication network of claim 12 wherein the first telephony device is a SIP-enable telephone or the TDM telephone and wherein
- when the first telephony device is the TDM telephone, the logical representation and the physical representation of the first telephony device is associated with a phone number of the telephony device; and
- when the first telephony device is the SIP-enabled telephone,
  - the logical representation of the first telephony device is associated with an electronic mail address; and
  - the physical representation of the first telephony device is associated with a fully qualified domain name.

14. The communication network of claim 12 wherein the determining of the relationship between the first telephony device and the client system includes searching a network directory for a listing of the telephony devices within the communication network.

15. The communication network of claim 12 wherein the establishing of the device control channel between the physical representation of the first telephony device and the client system comprises:
- sending a SIP INVITE message from the client system to the physical representation of the first telephony device;
- receiving a SIP OK response sent from the physical representation of the first telephony device to the client system;
- sending a SIP acknowledgement (ACK) message from the client system to the physical representation of the first telephony device in response to receiving the SIP OK response; and
- sending a SIP SUBSCRIBE message from the client system to the physical representation of the first telephony device;
- receiving a SIP OK response sent from the physical representation of the first telephony device to the client system; and
- receiving a SIP NOTIFY message from the physical representation of the first telephony device to the client system to notify the client device of changes in the status of a physical attribute of the telephony device.

16. The communication network of claim 12 wherein the establishing of the call control channel between the logical representation of the first telephony device and the client system comprises:
- sending a SIP OPTION message from the client system to the logical representation of the first telephony device;

receiving a SIP OK response sent from the logical representation of the first telephony device to the client system;

sending a SIP SUBSCRIBE message from the client system to the logical representation of the first telephony device;

receiving a SIP OK response sent from the logical representation of the first telephony device to the client system; and receiving a SIP NOTIFY message from the logical representation of the first telephony device to the client system to notify the client device of changes in the status of communication link of the first telephony device.

17. The communication network of claim 12 including a front end SIP unit in communication with the first telephony device and the client system adapted to convert SIP data to computer-telephony-itegration ("CTI") data and convert the CTI data to the SIP data when the first telephony device is a time division multiplexing ("TDM") device.

18. The communication network of claim 12 wherein the first telephony device is a SIP-enabled PBX phone.

* * * * *